United States Patent
DeWaal

(10) Patent No.: US 9,536,382 B2
(45) Date of Patent: ***Jan. 3, 2017

(54) GAMING SYSTEM AND METHOD FOR PROVIDING TEAM PLAY

(71) Applicant: IGT, Las Vegas, NV (US)

(72) Inventor: Daniel J. DeWaal, Las Vegas, NV (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/141,145

(22) Filed: Dec. 26, 2013

(65) Prior Publication Data

US 2014/0106869 A1    Apr. 17, 2014

Related U.S. Application Data

(63) Continuation of application No. 13/647,067, filed on Oct. 8, 2012, now Pat. No. 8,636,582, which is a
(Continued)

(51) Int. Cl.
*A63F 9/24* (2006.01)
*A63F 13/00* (2014.01)
(Continued)

(52) U.S. Cl.
CPC ........... *G07F 17/3244* (2013.01); *A63F 13/12* (2013.01); *G07F 17/3258* (2013.01); *G07F 17/3267* (2013.01); *G07F 17/3274* (2013.01)

(58) Field of Classification Search
CPC .............................. G07F 17/32; G07F 17/3267
(Continued)

(56) References Cited

U.S. PATENT DOCUMENTS

| 4,012,046 A | 3/1977 | Liket |
| 4,129,304 A | 12/1978 | Mager |

(Continued)

FOREIGN PATENT DOCUMENTS

| EP | 0 375 190 | 6/1990 |
| GB | 1 242 298 | 8/1971 |

(Continued)

OTHER PUBLICATIONS

VirtualBoyZ et al., "How do I switch teams on CSS", GameSpot, May 30, 2007 retrieved from Internet at http://http://www.gamespot.com/forums/pc-mac-discussion-1000004/how-do-i-switch-teams-on-css-25439979/ on Oct. 31, 2014.*

(Continued)

*Primary Examiner* — Jason Skaarup
*Assistant Examiner* — Ryan Hsu
(74) *Attorney, Agent, or Firm* — Neal, Gerber & Eisenberg LLP

(57) ABSTRACT

A gaming system where in one embodiment, as players play the primary games of the gaming devices, players are enabled to join one of a plurality of teams associated with a secondary team game. Each of the teams includes a plurality of players. The gaming system periodically monitors at least one factor or parameter of each player's gaming activity to determine a score for that player. In one embodiment, the scores for each of the players on each team are accumulated to determine that team's cumulative score. If a team's cumulative score reaches a winning value, the gaming system provides a prize to one or more of the players on that team. The gaming system enables players to switch from one team to another in attempt to be on a particular team when that team's cumulative score reaches a winning value.

20 Claims, 14 Drawing Sheets

Related U.S. Application Data continuation of application No. 11/937,794, filed on Nov. 9, 2007, now Pat. No. 8,292,723.

(51) Int. Cl.
*G07F 17/32* (2006.01)
*A63F 13/30* (2014.01)

(58) Field of Classification Search
USPC .................................. 463/16, 20, 25, 29, 42
See application file for complete search history.

(56) References Cited

U.S. PATENT DOCUMENTS

| | | | |
|---|---|---|---|
| 4,363,485 A | 12/1982 | Edwall | |
| 4,373,732 A | 2/1983 | Ogilvie | |
| 4,582,324 A | 4/1986 | Koza et al. | |
| 4,593,904 A | 6/1986 | Graves | |
| 4,618,150 A | 10/1986 | Kimura | |
| 4,652,998 A | 3/1987 | Koza et al. | |
| 4,666,160 A | 5/1987 | Hamilton | |
| 4,781,377 A | 11/1988 | McVean et al. | |
| 4,805,907 A | 2/1989 | Hagiwara | |
| 4,837,728 A | 6/1989 | Barrie et al. | |
| 4,844,464 A | 7/1989 | Berge | |
| 4,936,588 A | 6/1990 | Rader et al. | |
| 4,948,133 A | 8/1990 | Helm et al. | |
| 4,976,438 A | 12/1990 | Tashiro et al. | |
| 5,014,988 A | 5/1991 | Mirando et al. | |
| 5,016,880 A | 5/1991 | Berge | |
| 5,048,833 A | 9/1991 | Lamle | |
| 5,083,800 A | 1/1992 | Lockton | |
| 5,114,155 A | 5/1992 | Tillery et al. | |
| 5,116,055 A | 5/1992 | Tracy | |
| 5,249,800 A | 10/1993 | Hilgendorf | |
| 5,280,909 A | 1/1994 | Tracy | |
| 5,292,127 A | 3/1994 | Kelly et al. | |
| 5,320,351 A | 6/1994 | Suzuki | |
| 5,342,049 A | 8/1994 | Wichinsky et al. | |
| 5,342,058 A | 8/1994 | Giovannetti | |
| 5,409,225 A | 4/1995 | Kelly et al. | |
| 5,411,270 A | 5/1995 | Naka et al. | |
| 5,411,271 A | 5/1995 | Mirando | |
| 5,560,603 A | 10/1996 | Seelig et al. | |
| 5,618,045 A | 4/1997 | Kagan et al. | |
| 5,643,088 A | 7/1997 | Vaughn et al. | |
| 5,667,217 A | 9/1997 | Kelly et al. | |
| 5,676,371 A | 10/1997 | Kelly et al. | |
| 5,700,008 A | 12/1997 | Lawlor et al. | |
| 5,704,612 A | 1/1998 | Kelly et al. | |
| 5,733,193 A | 3/1998 | Allard et al. | |
| 5,769,424 A | 6/1998 | Kelly et al. | |
| 5,772,509 A | 6/1998 | Weiss | |
| 5,779,544 A | 7/1998 | Seelig et al. | |
| 5,803,451 A | 9/1998 | Kelly et al. | |
| 5,882,258 A | 3/1999 | Kelly et al. | |
| 5,967,514 A | 10/1999 | Kelly et al. | |
| 6,007,426 A | 12/1999 | Kelly et al. | |
| 6,019,369 A | 2/2000 | Nakagawa et al. | |
| 6,048,271 A | 4/2000 | Barcelou | |
| 6,077,163 A | 6/2000 | Walker et al. | |
| 6,089,976 A | 7/2000 | Schneider et al. | |
| 6,117,007 A | 9/2000 | Matsuyama et al. | |
| 6,117,008 A | 9/2000 | Machiguchi | |
| 6,126,547 A | 10/2000 | Ishimoto | |
| 6,168,523 B1 | 1/2001 | Piechowiak et al. | |
| 6,174,237 B1 | 1/2001 | Stephenson | |
| 6,193,606 B1 | 2/2001 | Walker et al. | |
| 6,234,896 B1 | 5/2001 | Walker et al. | |
| 6,364,765 B1 | 4/2002 | Walker et al. | |
| 6,375,568 B1 | 4/2002 | Roffman et al. | |
| 6,406,369 B1 | 6/2002 | Baerlocher et al. | |
| 6,454,651 B1 | 9/2002 | Yoseloff | |
| 6,500,068 B2 | 12/2002 | Walker et al. | |
| 6,503,146 B2 * | 1/2003 | Walker ................... G07F 17/32 273/138.1 |
| 6,554,704 B2 | 4/2003 | Nicastro et al. | |
| 6,572,473 B1 | 6/2003 | Baerlocher | |
| 6,656,040 B1 | 12/2003 | Brosnan et al. | |
| 6,688,978 B1 * | 2/2004 | Herman .................... 463/25 |
| 6,726,565 B2 | 4/2004 | Hughs-Baird | |
| 6,733,390 B2 | 5/2004 | Walker et al. | |
| 6,761,632 B2 | 7/2004 | Bansemer et al. | |
| 6,780,103 B2 | 8/2004 | Bansemer et al. | |
| 6,780,111 B2 | 8/2004 | Cannon et al. | |
| 6,786,824 B2 | 9/2004 | Cannon | |
| 6,790,140 B1 | 9/2004 | Niwa | |
| 6,793,575 B2 | 9/2004 | Brown et al. | |
| 6,811,482 B2 | 11/2004 | Letovsky | |
| 6,817,948 B2 | 11/2004 | Pascal et al. | |
| 6,837,793 B2 | 1/2005 | McClintic | |
| 6,893,341 B2 | 5/2005 | Walker et al. | |
| 6,902,478 B2 | 6/2005 | McClintic | |
| 6,908,390 B2 | 6/2005 | Nguyen et al. | |
| 6,984,174 B2 | 1/2006 | Cannon et al. | |
| 7,056,210 B2 | 6/2006 | Bansemer et al. | |
| 7,156,735 B2 | 1/2007 | Brosnan et al. | |
| 7,169,041 B2 | 1/2007 | Tessmer et al. | |
| 7,175,524 B2 | 2/2007 | Bansemer et al. | |
| 7,198,572 B2 | 4/2007 | Walker et al. | |
| 7,311,598 B2 | 12/2007 | Kaminkow et al. | |
| 7,311,604 B2 | 12/2007 | Kaminkow et al. | |
| 7,361,085 B2 | 4/2008 | Packes, Jr. et al. | |
| 7,387,571 B2 | 6/2008 | Walker et al. | |
| 7,637,811 B2 | 12/2009 | Walker et al. | |
| 7,662,040 B2 | 2/2010 | Englman et al. | |
| 8,500,548 B2 | 8/2013 | Baerlocher et al. | |
| 2001/0004609 A1 * | 6/2001 | Walker et al. ................ 463/42 |
| 2002/0016200 A1 | 2/2002 | Baerlocher et al. | |
| 2002/0039923 A1 * | 4/2002 | Cannon et al. ................ 463/42 |
| 2002/0147040 A1 | 10/2002 | Walker et al. | |
| 2003/0036430 A1 | 2/2003 | Cannon | |
| 2003/0060264 A1 | 3/2003 | Chilton et al. | |
| 2003/0060266 A1 | 3/2003 | Baerlocher | |
| 2003/0064773 A1 | 4/2003 | Baerlocher et al. | |
| 2003/0069068 A1 | 4/2003 | Kaminkow | |
| 2003/0104854 A1 | 6/2003 | Cannon | |
| 2003/0104860 A1 | 6/2003 | Cannon et al. | |
| 2003/0114218 A1 | 6/2003 | McClintic | |
| 2003/0114219 A1 | 6/2003 | McClintic | |
| 2003/0114220 A1 | 6/2003 | McClintic | |
| 2003/0119576 A1 | 6/2003 | McClintic et al. | |
| 2003/0119581 A1 | 6/2003 | Cannon et al. | |
| 2003/0125102 A1 | 7/2003 | Cannon | |
| 2003/0125107 A1 | 7/2003 | Cannon | |
| 2003/0130041 A1 | 7/2003 | Pascal et al. | |
| 2003/0171144 A1 | 9/2003 | Letovsky | |
| 2003/0181231 A1 | 9/2003 | Vancura et al. | |
| 2003/0186733 A1 | 10/2003 | Wolf et al. | |
| 2003/0186745 A1 | 10/2003 | Nguyen et al. | |
| 2003/0220138 A1 | 11/2003 | Walker et al. | |
| 2003/0228901 A1 | 12/2003 | Walker et al. | |
| 2004/0063492 A1 | 4/2004 | Baerlocher | |
| 2004/0116173 A1 | 6/2004 | Baerlocher | |
| 2004/0116174 A1 | 6/2004 | Baerlocher et al. | |
| 2004/0162130 A1 | 8/2004 | Walker et al. | |
| 2004/0162134 A1 * | 8/2004 | Walker ............... G07F 17/32 463/20 |
| 2004/0176157 A1 | 9/2004 | Walker et al. | |
| 2004/0198490 A1 | 10/2004 | Bansemer et al. | |
| 2004/0204218 A1 | 10/2004 | Hughs-Baird | |
| 2004/0204226 A1 | 10/2004 | Foster et al. | |
| 2005/0020340 A1 | 1/2005 | Cannon | |
| 2005/0026664 A1 | 2/2005 | Bansemer et al. | |
| 2005/0043088 A1 | 2/2005 | Nguyen et al. | |
| 2005/0043089 A1 | 2/2005 | Nguyen et al. | |
| 2005/0043094 A1 | 2/2005 | Nguyen et al. | |
| 2005/0054429 A1 | 3/2005 | Baerlocher et al. | |
| 2005/0060050 A1 | 3/2005 | Baerlocher et al. | |
| 2005/0085294 A1 | 4/2005 | Walker et al. | |
| 2005/0113162 A1 * | 5/2005 | Olive et al. .................... 463/16 |
| 2005/0181853 A1 | 8/2005 | Baerlocher | |
| 2005/0233794 A1 | 10/2005 | Cannon et al. | |
| 2006/0030399 A1 | 2/2006 | Baerlocher | |
| 2006/0030959 A1 | 2/2006 | Duhamel | |

(56) References Cited

U.S. PATENT DOCUMENTS

| | | |
|---|---|---|
| 2006/0030960 A1 | 2/2006 | Duhamel et al. |
| 2006/0040723 A1 | 2/2006 | Baerlocher et al. |
| 2006/0040732 A1 | 2/2006 | Baerlocher et al. |
| 2006/0040733 A1 | 2/2006 | Baerlocher et al. |
| 2006/0040734 A1 | 2/2006 | Baerlocher et al. |
| 2006/0040736 A1 | 2/2006 | Baerlocher et al. |
| 2006/0046821 A1 | 3/2006 | Kaminkow et al. |
| 2006/0046822 A1 | 3/2006 | Kaminkow et al. |
| 2006/0094495 A1 | 5/2006 | Gelber et al. |
| 2006/0128457 A1 | 6/2006 | Cannon |
| 2006/0138728 A1 | 6/2006 | Gordon et al. |
| 2006/0178185 A1 | 8/2006 | Weis |
| 2006/0214369 A1* | 9/2006 | Montocchio ............ A63F 3/00 273/243 |
| 2006/0232012 A1 | 10/2006 | Boyer |
| 2006/0246983 A1 | 11/2006 | Huard et al. |
| 2006/0252521 A1 | 11/2006 | Gururajan et al. |
| 2006/0281515 A1 | 12/2006 | Robinson |
| 2007/0054726 A1 | 3/2007 | Muir et al. |
| 2007/0054732 A1 | 3/2007 | Baerlocher |
| 2007/0054733 A1 | 3/2007 | Baerlocher |
| 2007/0077990 A1 | 4/2007 | Cuddy et al. |
| 2007/0099688 A1 | 5/2007 | Brosnan et al. |
| 2007/0149292 A1 | 6/2007 | Kaminkow et al. |
| 2007/0155485 A1 | 7/2007 | Cuddy et al. |
| 2007/0167210 A1* | 7/2007 | Kelly ................ G07F 17/32 463/16 |
| 2007/0167217 A1 | 7/2007 | Kaminkow et al. |
| 2007/0218975 A1* | 9/2007 | Iddings ............... G07F 17/32 463/25 |
| 2009/0124363 A1 | 5/2009 | Baerlocher et al. |

FOREIGN PATENT DOCUMENTS

| | | |
|---|---|---|
| GB | 2 191 030 | 12/1987 |
| GB | 2 226 436 | 6/1990 |
| GB | 2 242 300 | 9/1991 |
| GB | 2 258 164 | 2/1993 |
| GB | 2 262 642 | 6/1993 |
| WO | WO 96/25725 | 8/1996 |
| WO | WO 98/51384 | 11/1998 |
| WO | WO 02/17250 | 2/2002 |
| WO | WO 2004/046859 | 3/2004 |
| WO | WO 2004/069356 | 8/2004 |
| WO | WO 2005/094347 | 10/2005 |
| WO | WO 2006/088498 | 8/2006 |
| WO | WO 2006/096752 | 9/2006 |
| WO | WO 2007/044908 | 4/2007 |

OTHER PUBLICATIONS

American Bandstand game brochure, written by IGT in 2001.
"Anchor Games and IGT Release the Quintessential Dick Clark Game, 'American Bandstand'" article, written by Frank Legato, published in Strictly Slots, Jan. 2002.
Auction Fever advertisement, written by Sierra Design Group, available prior to 2004.
Full House advertisement, published by Anchor Games in 2000.
Good Times game brochure, written by IGT in 1999.
The Big Shot! Jackpot Game advertisement, published by Aristocrat in 2002.
Run for Your Money Game brochure and description, written by Barcrest Ltd, available in 1994.

* cited by examiner

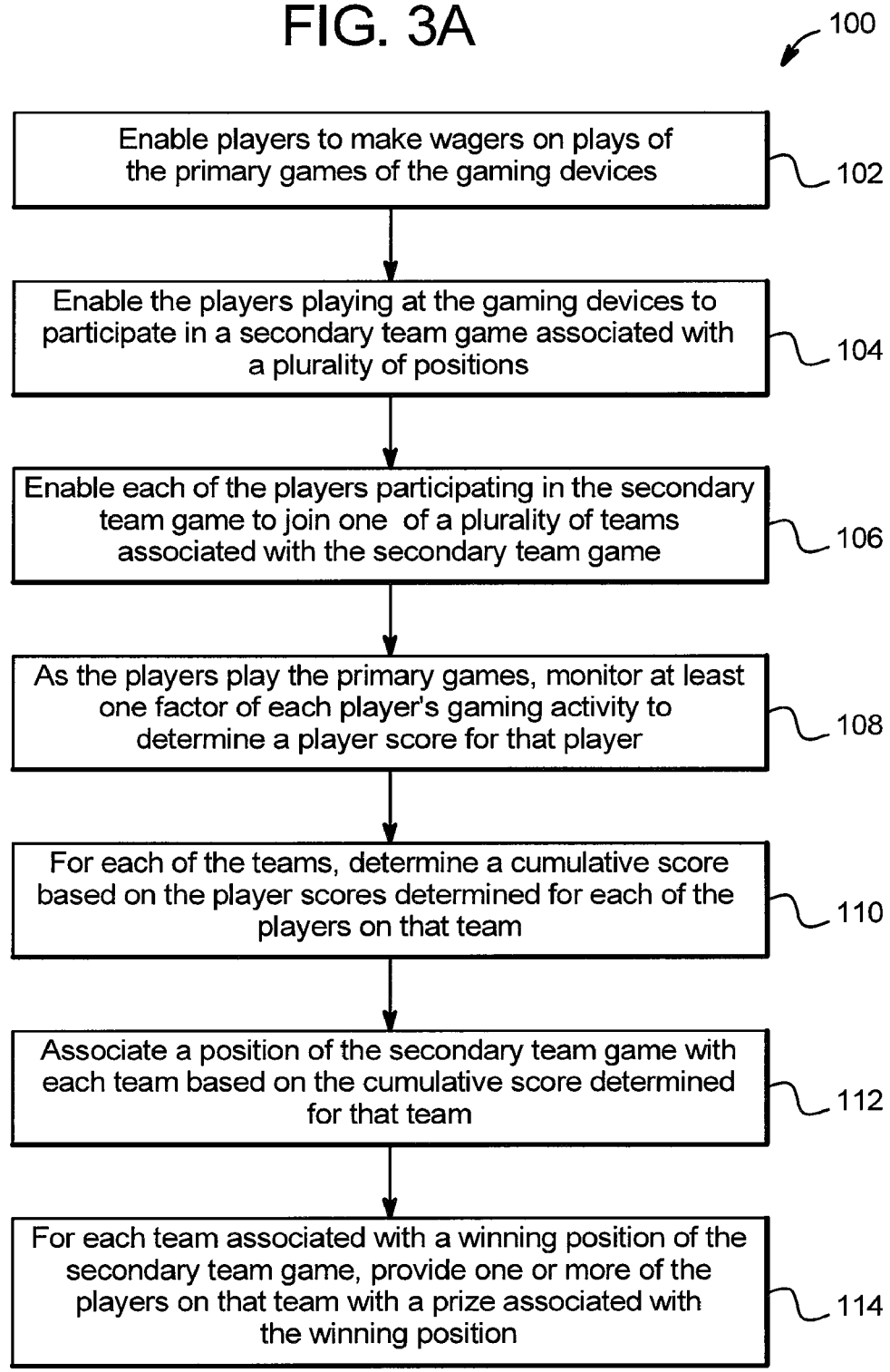

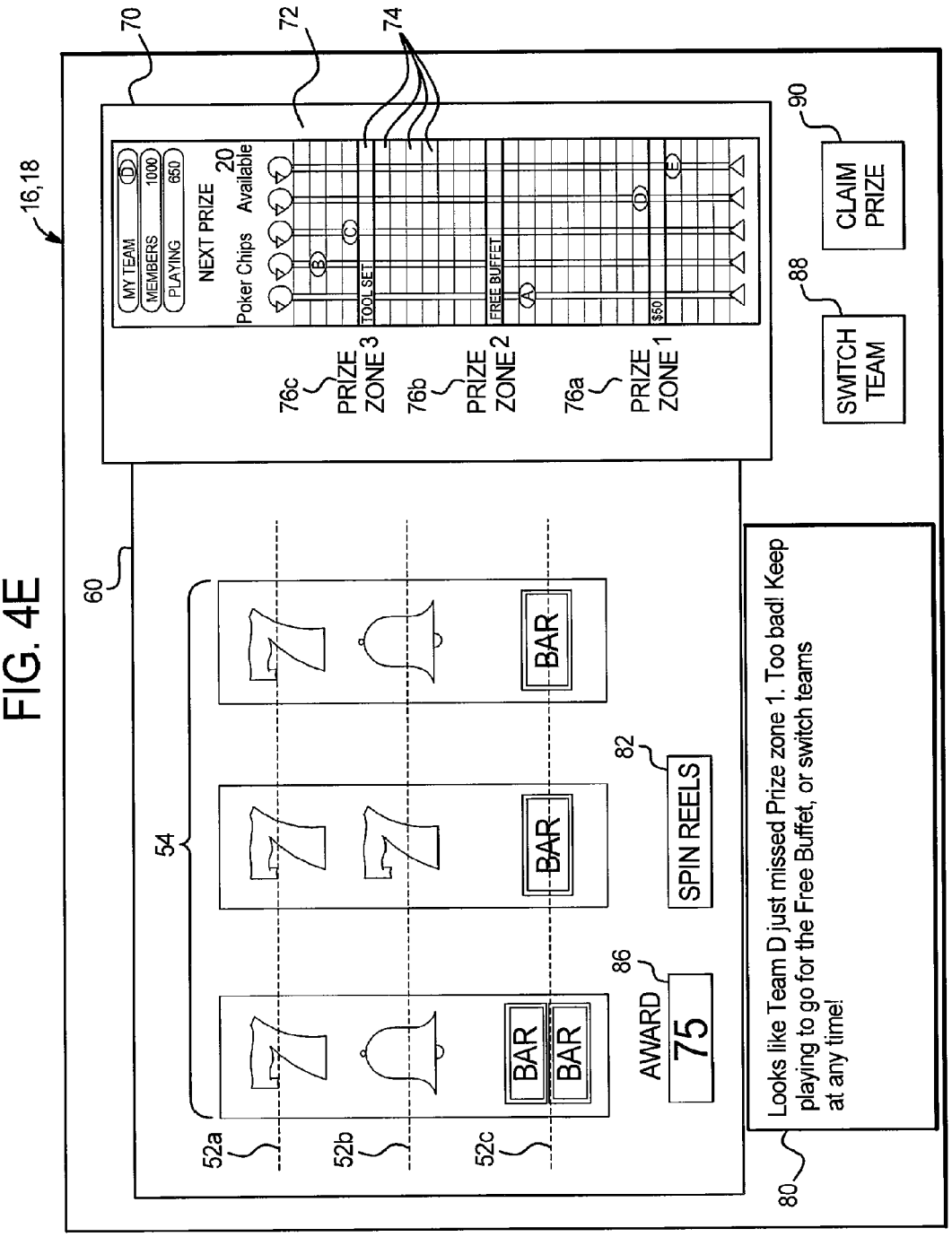

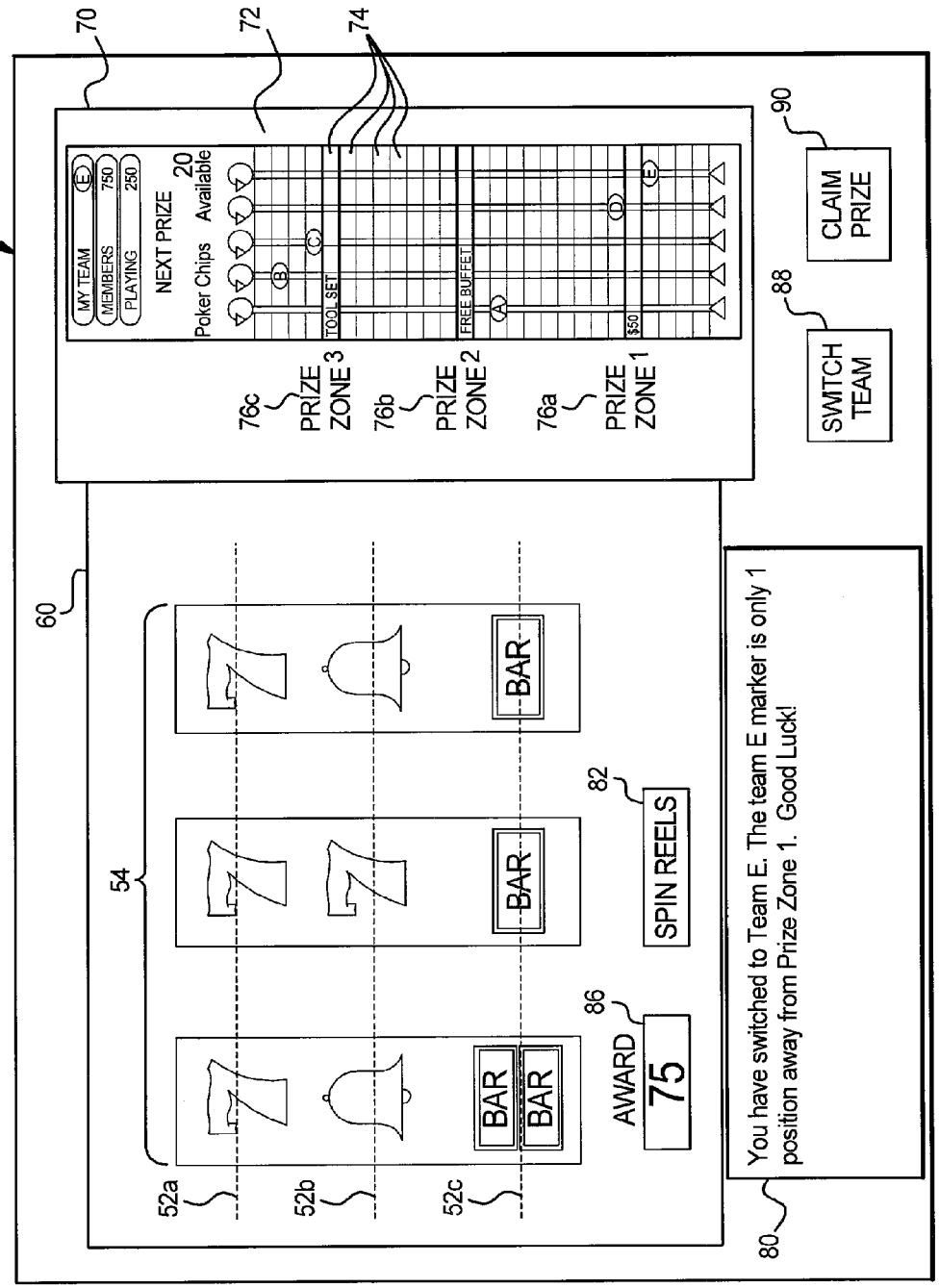

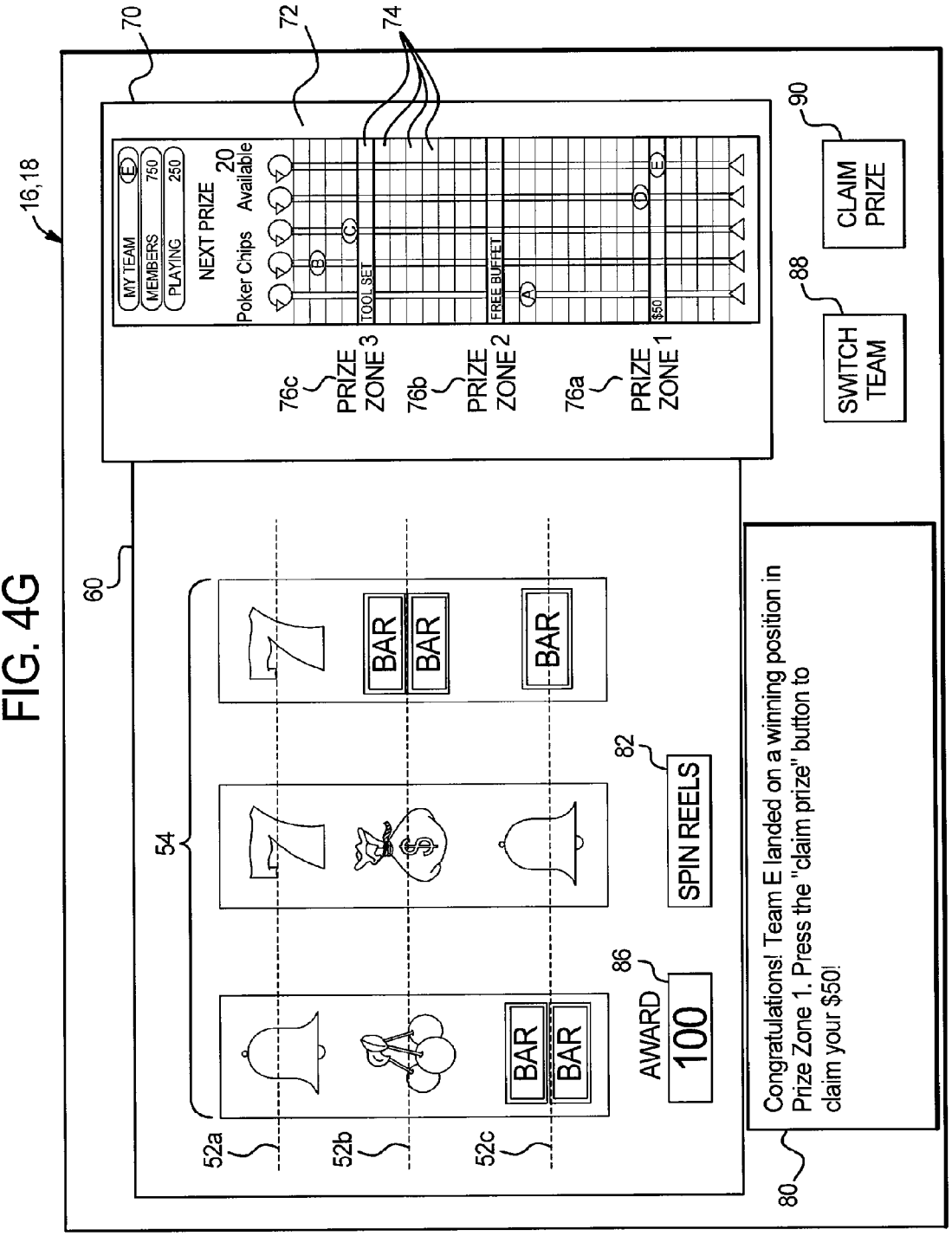

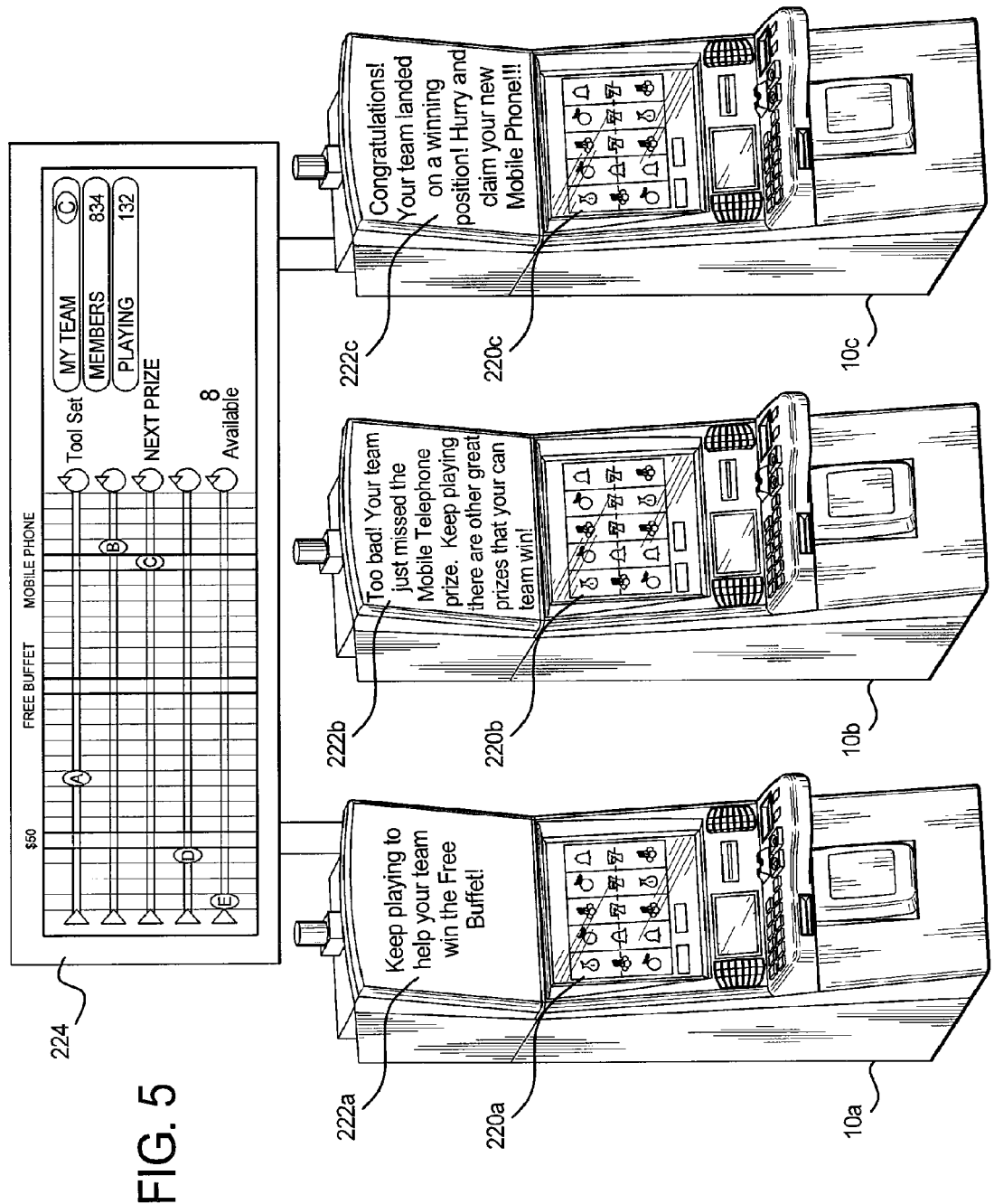

GAMING SYSTEM AND METHOD FOR PROVIDING TEAM PLAY

PRIORITY CLAIM

This application is a continuation of, and claims priority to and the benefit of, U.S. patent application Ser. No. 13/647,067, filed on Oct. 8, 2012, which is a continuation of, and claims priority to and the benefit of, U.S. patent application Ser. No. 11/937,794, filed on Nov. 9, 2007, which issued as U.S. Pat. No. 8,292,723 on Oct. 23, 2012, the entire contents of each of which are incorporated herein by reference.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

BACKGROUND

Gaming machines which provide players awards in primary or base games are well known. Gaming machines generally require the player to place or make a wager to activate the primary or base game. In many of these gaming machines, the award is based on the player obtaining a winning symbol or symbol combination and based on the amount of the wager (e.g., the higher the wager, the higher the award). Symbols or symbol combinations which are less likely to occur usually provide higher awards.

Secondary or bonus games are also known in gaming machines. The secondary or bonus games usually provide an additional award to the player. Secondary or bonus games usually do not require an additional wager by the player to be activated. Secondary or bonus games are generally activated or triggered upon an occurrence of a designated triggering symbol or triggering symbol combination in the primary or base game. For instance, a bonus symbol occurring on the payline on the third reel of a three reel slot machine may trigger the secondary bonus game. When a secondary or bonus game is triggered, the gaming machines generally indicates this to the player through one or more visual and/or audio output devices, such as the reels, lights, speakers, video screens, etc. Part of the enjoyment and excitement of playing certain gaming machines is the occurrence of the secondary or bonus game (even before the player knows how much the bonus award will be). In other words, obtaining a bonus award is part of the enjoyment and excitement for players.

In recent years, gaming has become a more social leisure activity. Casinos often strive for ways to allow players to work together in gaming. Working together can create camaraderie among the players and provide an enhanced gaming experience.

It is contemplated to provide secondary games which include a group gaming aspect, wherein a plurality of players playing at linked gaming machines participate in a group event for one or more awards. In certain known gaming systems, groups of gaming machines are grouped into teams. The players playing at such gaming machines have the opportunity to participate in a shared bonus event, such as a communal bonus game provided to the players upon a triggering condition. Based upon the number of members on a team and the players' wagering history, the team can compete in the bonus event with little or no strategy. In such systems, it is often difficult for the players to understand their interest or involvement in the bonus event.

To increase player enjoyment and excitement with gaming devices, it is desirable to provide new and different games which promote interactivity among players on a team thereby enhancing the casino experience while giving players decision making ability which affects the team's eligibility for prizes.

SUMMARY

One embodiment of the present disclosure provides a gaming system including a plurality of gaming devices which each include a primary game operable upon a wager by a player. The gaming system includes a secondary team game and enables players of the gaming devices to join one of a plurality of teams which each include a plurality of players. The gaming system monitors at least one factor or parameter of each player's gaming activity to determine a score or rank for that player. In one embodiment, the scores or ranks for each of the players are accumulated for each team. If a team's cumulative score or rank reaches a designated or winning value, the gaming system provides one or more of the players on that team a prize or designated awards. In various embodiments, the gaming system enables each of the players to switch from one team to another in attempt to be on a team when that team's cumulative score or rank reaches a winning value.

In various embodiments, each player may join a team or change teams in any suitable manner. In one embodiment, the gaming system enables the player to select their initial team. In another embodiment, the gaming system determines each player's initial team. In one embodiment, the gaming system enables the player to join a team or change teams while playing on a gaming machine of the gaming system. In another embodiment, the gaming system enables a player to join teams or change teams at another electronic device affiliated with the gaming establishment, such as a hand held device, a kiosk or a hotel room entertainment system. In another embodiment, the gaming system enables players to join or switch teams from an off-site location, such as via the Internet, as will be discussed in more detail below.

In one embodiment, the secondary game is associated with a community, group or team display device. The community, group or team display device includes a plurality of positions or locations wherein at least one of the positions or locations is associated with an award. In one such embodiment, the community or team display device is a game board which includes a plurality of positions. At least one of the positions on the game board is a winning position, and at least one of the positions is a non-winning position. In one embodiment, each of a plurality of teams associated with the secondary game is represented by a marker or symbol on the game board. The markers move to different positions on the game board based on move values which are determined by the gaming system for each of the teams. When a team's marker lands on a winning position of the game board, the gaming system provides the players of that team with an award or prize.

In one such embodiment, the gaming system provides each player playing at one of the gaming devices the opportunity to participate in or to qualify for the secondary team game. In one embodiment, if the player chooses or otherwise qualifies to participate in the secondary team game, the gaming system enables the player to join one of the teams associated with the secondary team game. Each of the teams includes or is capable of including a plurality of players. When selecting a team, the player tries to select a team when that team's marker is close to landing on a winning position on the game board. Thus, the player will have a better chance of winning an award in the secondary team game.

As the players play the primary games of their respective gaming devices, the gaming system monitors one or more factors of each player's gaming activity. For example, in various alternative embodiments, the gaming system monitors a player's wins, losses and/or the amount wagered by the player. The gaming system determines a score for each player based on the monitored factor. Based on the individual player scores determined for each of the players on a team, the gaming system determines a cumulative score for each team. The gaming system determines a move value for each team based on the determined cumulative score determined for that team. The gaming system causes the marker representing each team on the game board to move a number of positions on or around the game board based on the determined move value for that team.

In one such embodiment, the gaming system periodically determines the cumulative score for each team. In one embodiment, a time parameter is set for each team's gaming activity to be sampled. The game operator can establish the time parameter in any suitable manner. In different embodiments, the time parameter is random or is set to predetermined intervals. When the time parameter is met, the gaming system determines the cumulative score for each team and associates each team with a move value based on the determined cumulative score. The move value for each team is used to move that team's marker a number of spaces or positions on the game board. When a team's marker moves to a winning position on the game board, one or more prizes become available to the members of that team.

For example, to move one position on the game board, the gaming system requires a team to wager $1000. That is, the players on the team must collectively wager $1000 for their team to advance one position on the game board of the secondary team game. The gaming system evaluates the team's gaming activity (i.e., monitors the amounts wagered by each member of the team) at one hour intervals. The gaming system determines that, in a first hour, the members of the team have wagered $3000. Thus, the marker representing the team will move forward three positions on the game board for that one-hour interval.

In one embodiment, the gaming system enables players to change teams in an attempt to be on a team when that team's marker lands on one of the winning positions. That is, the gaming system enables players to switch teams to be on the team with the most advantageous board game position. In one such embodiment, players can change teams at any suitable or designated time. However, in various embodiments, changing teams does not guarantee a win. The players may not know which gaming activity factor or factors are being monitored to determine the players' scores. Thus, players can only guess where a particular team's marker will move next. The players estimate when and where a team's marker will move next based on how many people they think are on the team and which factors they believe are being monitored as each team member plays on his or her respective gaming device. From this estimation, a player tries to join the team she believes will land on a prize next or land on a specific prize that player wants. If the player is correct, the player has a chance to win a prize. If the player is incorrect (i.e., the marker did not move where the player thought it would), the player does not win a prize. The player can stay with the same team in attempt to win another prize, or the player can switch teams.

It should be appreciated that switching teams does not guarantee that a player will win a prize. For example, in one embodiment, the gaming system determines a move value for each team based on the total coin-in for that team within a designated time period. If too many players join a team, this could cause the move value determined for that team to dramatically increase which, in turn, could cause the team's marker to overshoot a winning position.

In this manner, the present disclosure provides an interactive game among players in which players can incorporate strategy and choice in determining which team they want to join. This enables players to have an active role while gaming and to make decisions which directly affect their ability to win an award or prize.

In different embodiments when a team marker reaches a winning position, one, a plurality, or each of the players of that team win an award. The number of awards or prizes available may be less than or equal to the number of members on the team. In one embodiment, the gaming establishment operator determines the number of awards for each winning position. In another embodiment, a player's status determines when the player can claim an award or how many awards are available to them. For example, if the team's marker lands on a winning position, the gaming system enables platinum players to claim the award first, while bronze players have to wait for a time period before claiming an award. In one embodiment, the gaming system only enables a certain number of team members to win an award. For example, the gaming system enables the first five members of the winning team that claim one of the awards to have the awards.

It should be appreciated that the awards may be any suitable types of awards including credits, gift certificates, or physical awards such as mobile telephones. In one embodiment, the gaming system queues the available awards and transfers or associates the awards with the winning positions in a first in first out manner. In this embodiment, the awards are rotated and change, resulting in the players having a degree of uncertainty as to which position a specific award is associated with. This embodiment enables players to strategize where the team's marker may land and to use strategy to change teams to try to align themselves with the team they feel has the greatest chance of winning the award the player wants.

In one alternative embodiment, the teams of the secondary game accumulate points based on the gaming activity of each team's players. In one such embodiment, when a team accumulates a winning number of points, the gaming system provides one or more players of that team with a designated award or prize. In one embodiment, the gaming system enables each of the players to switch from one team to another in attempt to be on a team when that team's accumulated number of points reaches a winning number of points. In one such embodiment, when a player switches teams, the player retains any points accumulated as a result of that player playing on the prior team. In another embodiment, the player does not keep the accumulated points when the player switches to a new team.

Accordingly, one advantage of the present disclosure is to provide an interactive team game in which players use strategy to determine which team to join and when to join such teams.

Another advantage of the present disclosure is to provide a game which enables players to make decisions which directly affect their ability to win a prize.

Additional features and advantages are described herein and will be apparent from the following Detailed Description and the figures.

BRIEF DESCRIPTION OF THE FIGURES

FIG. 3A is a flow chart illustrating one embodiment of the present disclosure.

FIGS. 4A to 4G illustrate screen shots for one player who is participating in the secondary team game of one embodiment of the present disclosure.

FIG. 5 illustrates one example embodiment of the present disclosure where a plurality of gaming devices are associated with a common or shared display configured to display information relating to the secondary team game.

DETAILED DESCRIPTION

The present disclosure may be implemented in various configurations for gaming machines or gaming devices, including but not limited to: (1) a dedicated gaming machine or gaming device, wherein the computerized instructions for controlling any games (which are provided by the gaming machine or gaming device) are provided with the gaming machine or gaming device prior to delivery to a gaming establishment; and (2) a changeable gaming machine or gaming device, where the computerized instructions for controlling any games (which are provided by the gaming machine or gaming device) are downloadable to the gaming machine or gaming device through a data network when the gaming machine or gaming device is in a gaming establishment. In one embodiment, the computerized instructions for controlling any games are executed by at least one central server, central controller or remote host. In such a "thin client" embodiment, the central server remotely controls any games (or other suitable interfaces) and the gaming device is utilized to display such games (or suitable interfaces) and receive one or more inputs or commands from a player. In another embodiment, the computerized instructions for controlling any games are communicated from the central server, central controller or remote host to a gaming device local processor and memory devices. In such a "thick client" embodiment, the gaming device local processor executes the communicated computerized instructions to control any games (or other suitable interfaces) provided to a player.

In one embodiment, one or more gaming devices in a gaming system may be thin client gaming devices and one or more gaming devices in the gaming system may be thick client gaming devices. In another embodiment, certain functions of the gaming device are implemented in a thin client environment and certain other functions of the gaming device are implemented in a thick client environment. In one such embodiment, computerized instructions for controlling any primary games are communicated from the central server to the gaming device in a thick client configuration and computerized instructions for controlling any secondary games or bonus functions are executed by a central server in a thin client configuration.

Figure 1A:
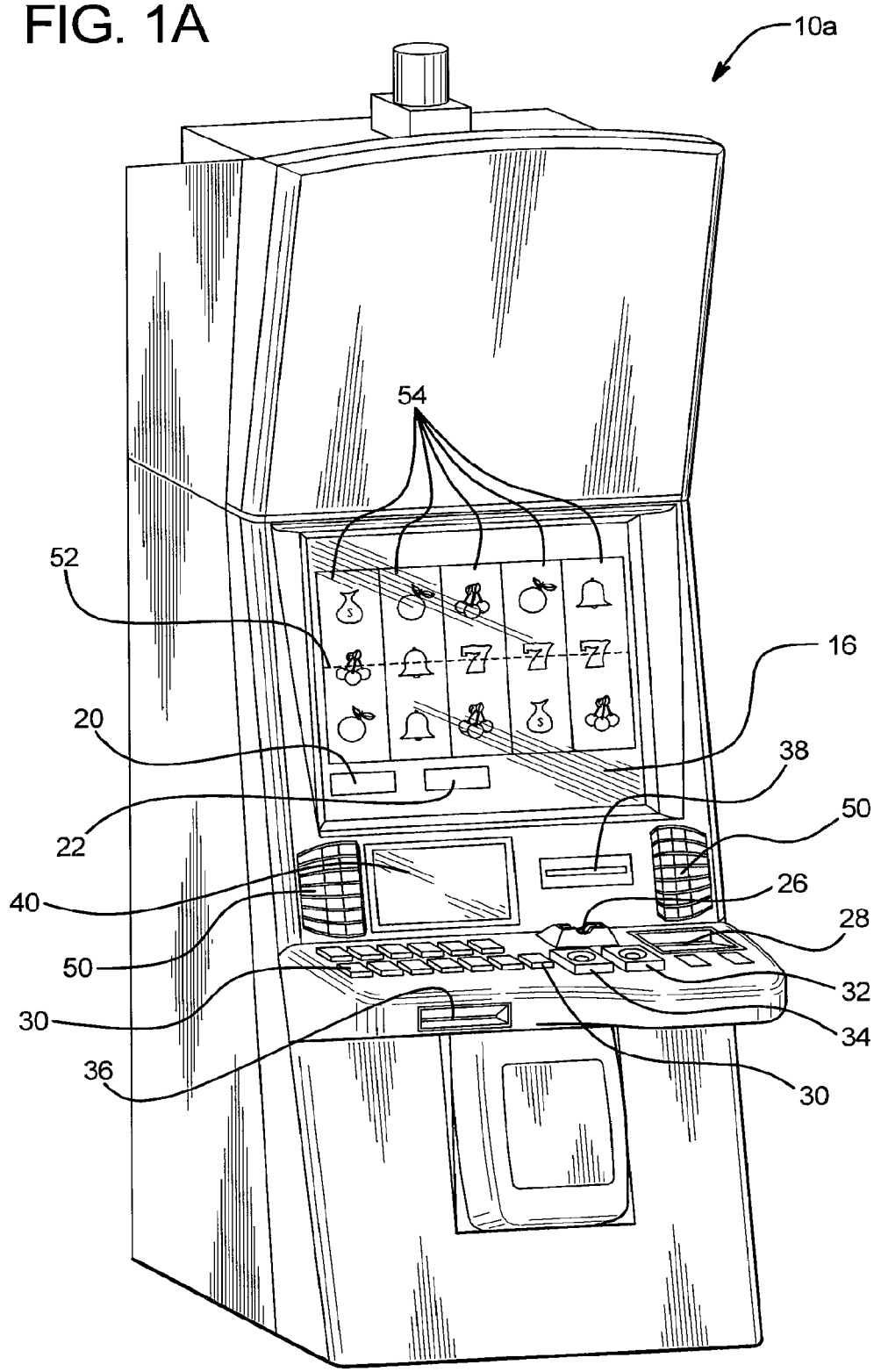
FIGS. 1A and 1B are perspective views of example alternative embodiments of the gaming device of the present disclosure.
Figure 1B:
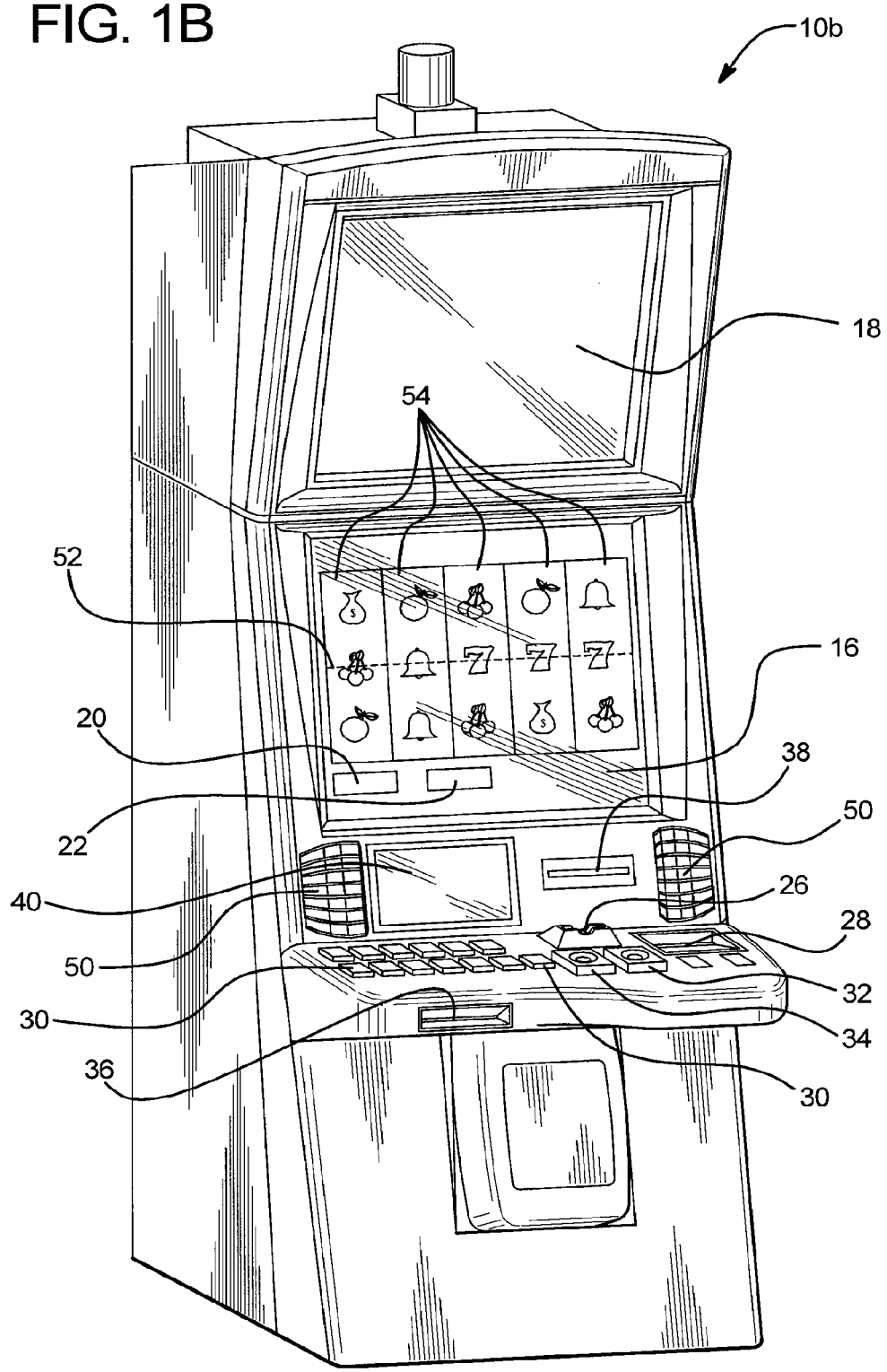

Referring now to the drawings, two example alternative embodiments of the gaming device disclosed herein are illustrated in FIGS. 1A and 1B as gaming device 10a and gaming device 10b, respectively. Gaming device 10a and/or gaming device 10b are generally referred to herein as gaming device 10.

In the embodiments illustrated in FIGS. 1A and 1B, gaming device 10 has a support structure, housing or cabinet which provides support for a plurality of displays, inputs, controls and other features of a conventional gaming machine. It is configured so that a player can operate it while standing or sitting. The gaming device may be positioned on a base or stand or can be configured as a pub-style table-top game (not shown) which a player can operate preferably while sitting. As illustrated by the different configurations shown in FIGS. 1A and 1B, the gaming device may have varying cabinet and display configurations.

Figure 2A:
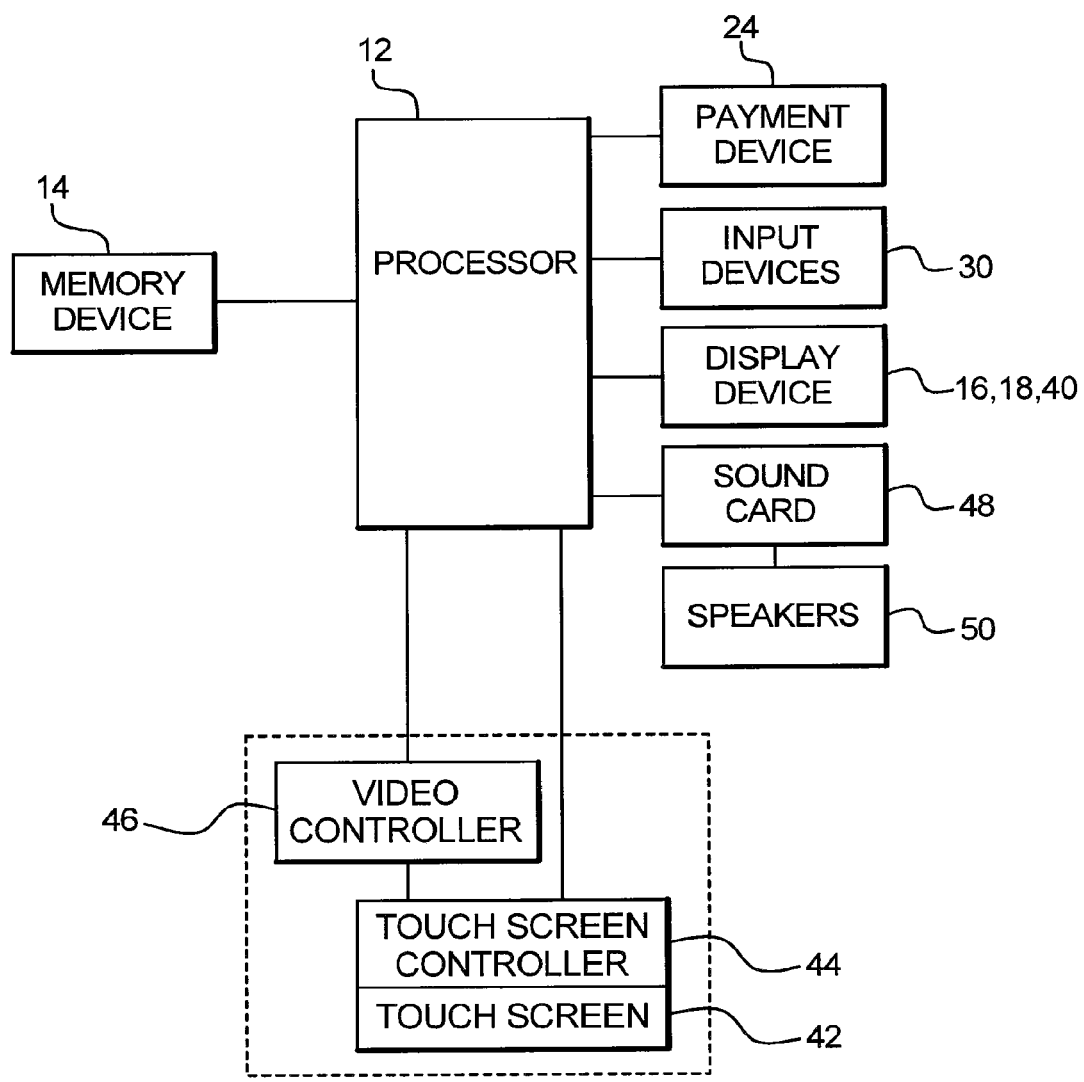
FIG. 2A is a schematic block diagram of one embodiment of an electronic configuration for one of the gaming devices disclosed herein.

In one embodiment, as illustrated in FIG. 2A, the gaming device preferably includes at least one processor 12, such as a microprocessor, a microcontroller-based platform, a suitable integrated circuit or one or more application-specific integrated circuits (ASIC's). The processor is in communication with or operable to access or to exchange signals with at least one data storage or memory device 14. In one embodiment, the processor and the memory device reside within the cabinet of the gaming device. The memory device stores program code and instructions, executable by the processor, to control the gaming device. The memory device also stores other data such as image data, event data, player input data, random or pseudo-random number generators, pay-table data or information and applicable game rules that relate to the play of the gaming device. In one embodiment, the memory device includes random access memory (RAM), which can include non-volatile RAM (NVRAM), magnetic RAM (MRAM), ferroelectric RAM (FeRAM) and other forms as commonly understood in the gaming industry. In one embodiment, the memory device includes read only memory (ROM). In one embodiment, the memory device includes flash memory and/or EEPROM (electrically erasable programmable read only memory). Any other suitable magnetic, optical and/or semiconductor memory may operate in conjunction with the gaming device disclosed herein.

In one embodiment, part or all of the program code and/or operating data described above can be stored in a detachable or removable memory device, including, but not limited to, a suitable cartridge, disk, CD ROM, DVD or USB memory device. In other embodiments, part or all of the program code and/or operating data described above can be downloaded to the memory device through a suitable network.

In one embodiment, an operator or a player can use such a removable memory device in a desktop computer, a laptop personal computer, a personal digital assistant (PDA), portable computing device, or other computerized platform to implement the present disclosure. In one embodiment, the gaming device or gaming machine disclosed herein is operable over a wireless network, such as part of a wireless gaming system. In this embodiment, the gaming machine may be a hand held device, a mobile device or any other suitable wireless device that enables a player to play any suitable game at a variety of different locations. It should be appreciated that a gaming device or gaming machine as disclosed herein may be a device that has obtained approval from a regulatory gaming commission or a device that has not obtained approval from a regulatory gaming commission. It should be appreciated that the processor and memory device may be collectively referred to herein as a "computer" or "controller."

In one embodiment, as discussed in more detail below, the gaming device randomly generates awards and/or other game outcomes based on probability data. In one such embodiment, this random determination is provided through utilization of a random number generator (RNG), such as a true random number generator, a pseudo random number generator or other suitable randomization process. In one embodiment, each award or other game outcome is associated with a probability and the gaming device generates the award or other game outcome to be provided to the player based on the associated probabilities. In this embodiment, since the gaming device generates outcomes randomly or based upon one or more probability calculations, there is no certainty that the gaming device will ever provide the player with any specific award or other game outcome.

In another embodiment, as discussed in more detail below, the gaming device employs a predetermined or finite set or pool of awards or other game outcomes. In this embodiment, as each award or other game outcome is provided to the player, the gaming device flags or removes the provided award or other game outcome from the predetermined set or pool. Once flagged or removed from the set or pool, the specific provided award or other game outcome from that specific pool cannot be provided to the player again. This type of gaming device provides players with all of the available awards or other game outcomes over the course of the play cycle and guarantees the amount of actual wins and losses.

In another embodiment, as discussed below, upon a player initiating game play at the gaming device, the gaming device enrolls in a bingo game. In this embodiment, a bingo server calls the bingo balls that result in a specific bingo game outcome. The resultant game outcome is communicated to the individual gaming device to be provided to a player. In one embodiment, this bingo outcome is displayed to the player as a bingo game and/or in any form in accordance with the present disclosure.

In one embodiment, as illustrated in FIG. 2A, the gaming device includes one or more display devices controlled by the processor. The display devices are preferably connected to or mounted to the cabinet of the gaming device. The embodiment shown in FIG. 1A includes a central display device 16 which displays a primary game. This display device may also display any suitable secondary game associated with the primary game as well as information relating to the primary or secondary game. The alternative embodiment shown in FIG. 1B includes a central display device 16 and an upper display device 18. The upper display device may display the primary game, any suitable secondary game associated or not associated with the primary game and/or information relating to the primary or secondary game. These display devices may also serve as digital glass operable to advertise games or other aspects of the gaming establishment. As seen in FIGS. 1A and 1B, in one embodiment, the gaming device includes a credit display 20 which displays a player's current number of credits, cash, account balance or the equivalent. In one embodiment, the gaming device includes a bet display 22 which displays a player's amount wagered. In one embodiment, as described in more detail below, the gaming device includes a player tracking display 40 which displays information regarding a player's playing tracking status.

In another embodiment, at least one display device may be a mobile display device, such as a PDA or tablet PC, that enables play of at least a portion of the primary or secondary game at a location remote from the gaming device.

The display devices may include, without limitation, a monitor, a television display, a plasma display, a liquid crystal display (LCD) a display based on light emitting diodes (LED), a display based on a plurality of organic light-emitting diodes (OLEDs), a display based on polymer light-emitting diodes (PLEDs), a display based on a plurality of surface-conduction electron-emitters (SEDs), a display including a projected and/or reflected image or any other suitable electronic device or display mechanism. In one embodiment, as described in more detail below, the display device includes a touch-screen with an associated touch-screen controller. The display devices may be of any suitable size and configuration, such as a square, a rectangle or an elongated rectangle.

The display devices of the gaming device are configured to display at least one and preferably a plurality of game or other suitable images, symbols and indicia such as any visual representation or exhibition of the movement of objects such as mechanical, virtual or video reels and wheels, dynamic lighting, video images, images of people, characters, places, things and faces of cards, and the like.

In one alternative embodiment, the symbols, images and indicia displayed on or of the display device may be in mechanical form. That is, the display device may include any electromechanical device, such as one or more mechanical objects, such as one or more rotatable wheels, reels or dice, configured to display at least one or a plurality of game or other suitable images, symbols or indicia.

As illustrated in FIG. 2A, in one embodiment, the gaming device includes at least one payment device 24 in communication with the processor. As seen in FIGS. 1A and 1B, a payment device such as a payment acceptor includes a note, ticket or bill acceptor 28 wherein the player inserts paper money, a ticket or voucher and a coin slot 26 where the player inserts money, coins, or tokens. In other embodiments, payment devices such as readers or validators for credit cards, debit cards or credit slips may accept payment. In one embodiment, a player may insert an identification card into a card reader of the gaming device. In one embodiment, the identification card is a smart card having a programmed microchip or a magnetic strip coded with a player's identification, credit totals (or related data) and other relevant information. In another embodiment, a player may carry a portable device, such as a cell phone, a radio frequency identification tag or any other suitable wireless device, which communicates a player's identification, credit totals (or related data) and other relevant information to the gaming device. In one embodiment, money may be transferred to a gaming device through electronic funds transfer. When a player funds the gaming device, the processor determines the amount of funds entered and displays the corresponding amount on the credit or other suitable display as described above.

As seen in FIGS. 1A, 1B and 2A, in one embodiment the gaming device includes at least one and preferably a plurality of input devices 30 in communication with the processor. The input devices can include any suitable device which enables the player to produce an input signal which is received by the processor. In one embodiment, after appropriate funding of the gaming device, the input device is a game activation device, such as a play button 32 or a pull arm (not shown) which is used by the player to start any primary game or sequence of events in the gaming device. The play button can be any suitable play activator such as a bet one button, a max bet button or a repeat the bet button. In one embodiment, upon appropriate funding, the gaming device begins the game play automatically. In another embodiment, upon the player engaging one of the play buttons, the gaming device automatically activates game play.

In one embodiment, one input device is a bet one button. The player places a bet by pushing the bet one button. The player can increase the bet by one credit each time the player pushes the bet one button. When the player pushes the bet one button, the number of credits shown in the credit display preferably decreases by one, and the number of credits shown in the bet display preferably increases by one. In another embodiment, one input device is a bet max button (not shown) which enables the player to bet the maximum wager permitted for a game of the gaming device.

In one embodiment, one input device is a cash out button 34. The player may push the cash out button and cash out to receive a cash payment or other suitable form of payment corresponding to the number of remaining credits. In one embodiment, when the player cashes out, a payment device, such as a ticket, payment or note generator 36 prints or otherwise generates a ticket or credit slip to provide to the player. The player receives the ticket or credit slip and may redeem the value associated with the ticket or credit slip via a cashier (or other suitable redemption system). In another embodiment, when the player cashes out, the player receives the coins or tokens in a coin payout tray. It should be appreciated that any suitable payout mechanisms, such as funding to the player's electronically recordable identification card may be implemented in accordance with the gaming device disclosed herein.

In one embodiment, as mentioned above and seen in FIG. 2A, one input device is a touch-screen 42 coupled with a touch-screen controller 44, or some other touch-sensitive display overlay to allow for player interaction with the images on the display. The touch-screen and the touch-screen controller are connected to a video controller 46. A player can make decisions and input signals into the gaming device by touching the touch-screen at the appropriate places. One such input device is a conventional touch-screen button panel.

The gaming device may further include a plurality of communication ports for enabling communication of the processor with external peripherals, such as external video sources, expansion buses, game or other displays, an SCSI port or a key pad.

In one embodiment, as seen in FIG. 2A, the gaming device includes a sound generating device controlled by one or more sounds cards 48 which function in conjunction with the processor. In one embodiment, the sound generating device includes at least one and preferably a plurality of speakers 50 or other sound generating hardware and/or software for generating sounds, such as playing music for the primary and/or secondary game or for other modes of the gaming device, such as an attract mode. In one embodiment, the gaming device provides dynamic sounds coupled with attractive multimedia images displayed on one or more of the display devices to provide an audio-visual representation or to otherwise display full-motion video with sound to attract players to the gaming device. During idle periods, the gaming device may display a sequence of audio and/or visual attraction messages to attract potential players to the gaming device. The videos may also be customized for or to provide any appropriate information.

In one embodiment, the gaming machine may include a sensor, such as a camera in communication with the processor (and possibly controlled by the processor) that is selectively positioned to acquire an image of a player actively using the gaming device and/or the surrounding area of the gaming device. In one embodiment, the camera may be configured to selectively acquire still or moving (e.g., video) images and may be configured to acquire the images in either an analog, digital or other suitable format. The display devices may be configured to display the image acquired by the camera as well as display the visible manifestation of the game in split screen or picture-in-picture fashion. For example, the camera may acquire an image of the player and the processor may incorporate that image into the primary and/or secondary game as a game image, symbol or indicia.

Gaming device 10 can incorporate any suitable wagering primary or base game. The gaming machine or device may include some or all of the features of conventional gaming machines or devices. The primary or base game may comprise any suitable reel-type game, card game, cascading or falling symbol game, number game or other game of chance susceptible to representation in an electronic or electromechanical form, which in one embodiment produces a random outcome based on probability data at the time of or after placement of a wager. That is, different primary wagering games, such as video poker games, video blackjack games, video keno, video bingo or any other suitable primary or base game may be implemented.

In one embodiment, as illustrated in FIGS. 1A and 1B, a base or primary game may be a slot game with one or more paylines 52. The paylines may be horizontal, vertical, circular, diagonal, angled or any combination thereof. In this embodiment, the gaming device includes at least one and preferably a plurality of reels 54, such as three to five reels 54, in either electromechanical form with mechanical rotating reels or video form with simulated reels and movement thereof. In one embodiment, an electromechanical slot machine includes a plurality of adjacent, rotatable reels which may be combined and operably coupled with an electronic display of any suitable type. In another embodiment, if the reels 54 are in video form, one or more of the display devices, as described above, display the plurality of simulated video reels 54. Each reel 54 displays a plurality of indicia or symbols, such as bells, hearts, fruits, numbers, letters, bars or other images which preferably correspond to a theme associated with the gaming device. In another embodiment, one or more of the reels are independent reels or unisymbol reels. In this embodiment, each independent or unisymbol reel generates and displays one symbol to the player. In one embodiment, the gaming device awards prizes after the reels of the primary game stop spinning if specified types and/or configurations of indicia or symbols occur on an active payline or otherwise occur in a winning pattern, occur on the requisite number of adjacent reels and/or occur in a scatter pay arrangement.

In an alternative embodiment, rather than determining any outcome to provide to the player by analyzing the symbols generated on any wagered upon paylines as described above, the gaming device determines any outcome to provide to the player based on the number of associated symbols which are generated in active symbol positions on the requisite number of adjacent reels (i.e., not on paylines passing through any displayed winning symbol combinations). In this embodiment, if a winning symbol combination is generated on the reels, the gaming device provides the player one award for that occurrence of the generated winning symbol combination. For example, if one winning symbol combination is generated on the reels, the gaming device will provide a single award to the player for that winning symbol combination (i.e., not based on the number of paylines that would have passed through that winning symbol combination). It should be appreciated that because a gaming device with wagering on ways to win provides the player one award for a single occurrence of a winning symbol combination and a gaming device with paylines may provide the player more than one award for the same occurrence of a single winning symbol combination (i.e., if a plurality of paylines each pass through the same winning symbol combination), it is possible to provide a player at a ways to win gaming device with more ways to win for an equivalent bet or wager on a traditional slot gaming device with paylines.

In one embodiment, the total number of ways to win is determined by multiplying the number of symbols generated in active symbol positions on a first reel by the number of symbols generated in active symbol positions on a second reel by the number of symbols generated in active symbol positions on a third reel and so on for each reel of the gaming device with at least one symbol generated in an active symbol position. For example, a three reel gaming device with three symbols generated in active symbol positions on each reel includes 27 ways to win (i.e., 3 symbols on the first reel×3 symbols on the second reel×3 symbols on the third reel). A four reel gaming device with three symbols generated in active symbol positions on each reel includes 81 ways to win (i.e., 3 symbols on the first reel×3 symbols on the second reel×3 symbols on the third reel×3 symbols on the fourth reel). A five reel gaming device with three symbols generated in active symbol positions on each reel includes 243 ways to win (i.e., 3 symbols on the first reel×3 symbols on the second reel×3 symbols on the third reel×3 symbols on the fourth reel×3 symbols on the fifth reel). It should be appreciated that modifying the number of generated symbols by either modifying the number of reels or modifying the number of symbols generated in active symbol positions by one or more of the reels, modifies the number of ways to win.

In another embodiment, the gaming device enables a player to wager on and thus activate symbol positions. In one such embodiment, the symbol positions are on the reels. In this embodiment, if based on the player's wager, a reel is activated, then each of the symbol positions of that reel will be activated and each of the active symbol positions will be part of one or more of the ways to win. In one embodiment, if based on the player's wager, a reel is not activated, then a designated number of default symbol positions, such as a single symbol position of the middle row of the reel, will be activated and the default symbol position(s) will be part of one or more of the ways to win. This type of gaming machine enables a player to wager on one, more or each of the reels and the processor of the gaming device uses the number of wagered on reels to determine the active symbol positions and the number of possible ways to win. In alternative embodiments, (1) no symbols are displayed as generated at any of the inactive symbol positions, or (2) any symbols generated at any inactive symbol positions may be displayed to the player but suitably shaded or otherwise designated as inactive.

In one embodiment wherein a player wagers on one or more reels, a player's wager of one credit may activate each of the three symbol positions on a first reel, wherein one default symbol position is activated on each of the remaining four reels. In this example, as described above, the gaming device provides the player three ways to win (i.e., 3 symbols on the first reel×1 symbol on the second reel×1 symbol on the third reel×1 symbol on the fourth reel×1 symbol on the fifth reel). In another example, a player's wager of nine credits may activate each of the three symbol positions on a first reel, each of the three symbol positions on a second reel and each of the three symbol positions on a third reel wherein one default symbol position is activated on each of the remaining two reels. In this example, as described above, the gaming device provides the player twenty-seven ways to win (i.e., 3 symbols on the first reel×3 symbols on the second reel×3 symbols on the third reel×1 symbol on the fourth reel×1 symbol on the fifth reel).

In one embodiment, to determine any award(s) to provide to the player based on the generated symbols, the gaming device individually determines if a symbol generated in an active symbol position on a first reel forms part of a winning symbol combination with or is otherwise suitably related to a symbol generated in an active symbol position on a second reel. In this embodiment, the gaming device classifies each pair of symbols which form part of a winning symbol combination (i.e., each pair of related symbols) as a string of related symbols. For example, if active symbol positions include a first cherry symbol generated in the top row of a first reel and a second cherry symbol generated in the bottom row of a second reel, the gaming device classifies the two cherry symbols as a string of related symbols because the two cherry symbols form part of a winning symbol combination.

After determining if any strings of related symbols are formed between the symbols on the first reel and the symbols on the second reel, the gaming device determines if any of the symbols from the next adjacent reel should be added to any of the formed strings of related symbols. In this embodiment, for a first of the classified strings of related symbols, the gaming device determines if any of the symbols generated by the next adjacent reel form part of a winning symbol combination or are otherwise related to the symbols of the first string of related symbols. If the gaming device determines that a symbol generated on the next adjacent reel is related to the symbols of the first string of related symbols, that symbol is subsequently added to the first string of related symbols. For example, if the first string of related symbols is the string of related cherry symbols and a related cherry symbol is generated in the middle row of the third reel, the gaming device adds the related cherry symbol generated on the third reel to the previously classified string of cherry symbols.

On the other hand, if the gaming device determines that no symbols generated on the next adjacent reel are related to the symbols of the first string of related symbols, the gaming device marks or flags such string of related symbols as complete. For example, if the first string of related symbols is the string of related cherry symbols and none of the symbols of the third reel are related to the cherry symbols of the previously classified string of cherry symbols, the gaming device marks or flags the string of cherry symbols as complete.

After either adding a related symbol to the first string of related symbols or marking the first string of related symbols as complete, the gaming device proceeds as described above for each of the remaining classified strings of related symbols which were previously classified or formed from related symbols on the first and second reels.

After analyzing each of the remaining strings of related symbols, the gaming device determines, for each remaining pending or incomplete string of related symbols, if any of the symbols from the next adjacent reel, if any, should be added to any of the previously classified strings of related symbols. This process continues until either each string of related symbols is complete or there are no more adjacent reels of symbols to analyze. In this embodiment, where there are no more adjacent reels of symbols to analyze, the gaming device marks each of the remaining pending strings of related symbols as complete.

When each of the strings of related symbols is marked complete, the gaming device compares each of the strings of related symbols to an appropriate paytable and provides the player any award associated with each of the completed strings of symbols. It should be appreciated that the player is provided one award, if any, for each string of related symbols generated in active symbol positions (i.e., as opposed to being based on how many paylines that would have passed through each of the strings of related symbols in active symbol positions).

In one embodiment, a base or primary game may be a poker game wherein the gaming device enables the player to play a conventional game of video draw poker and initially deals five cards all face up from a virtual deck of fifty-two card deck. Cards may be dealt as in a traditional game of cards or in the case of the gaming device, may also include that the cards are randomly selected from a predetermined number of cards. If the player wishes to draw, the player selects the cards to hold via one or more input device, such as pressing related hold buttons or via the touch screen. The player then presses the deal button and the unwanted or discarded cards are removed from the display and the gaming machine deals the replacement cards from the remaining cards in the deck. This results in a final five-card hand. The gaming device compares the final five-card hand to a payout table which utilizes conventional poker hand rankings to determine the winning hands. The gaming device provides the player with an award based on a winning hand and the credits the player wagered.

In another embodiment, the base or primary game may be a multi-hand version of video poker. In this embodiment, the gaming device deals the player at least two hands of cards. In one such embodiment, the cards are the same cards. In one embodiment each hand of cards is associated with its own deck of cards. The player chooses the cards to hold in a primary hand. The held cards in the primary hand are also held in the other hands of cards. The remaining non-held cards are removed from each hand displayed and for each hand replacement cards are randomly dealt into that hand. Since the replacement cards are randomly dealt independently for each hand, the replacement cards for each hand will usually be different. The poker hand rankings are then determined hand by hand and awards are provided to the player.

In one embodiment, a base or primary game may be a keno game wherein the gaming device displays a plurality of selectable indicia or numbers on at least one of the display devices. In this embodiment, the player selects at least one or a plurality of the selectable indicia or numbers via an input device such as the touch screen. The gaming device then displays a series of drawn numbers to determine an amount of matches, if any, between the player's selected numbers and the gaming device's drawn numbers. The player is provided an award based on the amount of matches, if any, based on the amount of determined matches and the number of numbers drawn.

In one embodiment, in addition to winning credits or other awards in a base or primary game, the gaming device may also give players the opportunity to win credits in a bonus or secondary game or bonus or secondary round. The bonus or secondary game enables the player to obtain a prize or payout in addition to the prize or payout, if any, obtained from the base or primary game. In general, a bonus or secondary game produces a significantly higher level of player excitement than the base or primary game because it provides a greater expectation of winning than the base or primary game and is accompanied with more attractive or unusual features than the base or primary game. In one embodiment, the bonus or secondary game may be any type of suitable game, either similar to or completely different from the base or primary game.

In one embodiment, the triggering event or qualifying condition may be a selected outcome in the primary game or a particular arrangement of one or more indicia on a display device in the primary game, such as the number seven appearing on three adjacent reels along a payline in the primary slot game embodiment seen in FIGS. 1A and 1B. In other embodiments, the triggering event or qualifying condition may be by exceeding a certain amount of game play (such as number of games, number of credits, amount of time), or reaching a specified number of points earned during game play.

In another embodiment, the gaming device processor 12 or central server 56 randomly provides the player one or more plays of one or more secondary games. In one such embodiment, the gaming device does not provide any apparent reasons to the player for qualifying to play a secondary or bonus game. In this embodiment, qualifying for a bonus game is not triggered by an event in or based specifically on any of the plays of any primary game. That is, the gaming device may simply qualify a player to play a secondary game without any explanation or alternatively with simple explanations. In another embodiment, the gaming device (or central server) qualifies a player for a secondary game at least partially based on a game triggered or symbol triggered event, such as at least partially based on the play of a primary game.

In one embodiment, the gaming device includes a program which will automatically begin a bonus round after the player has achieved a triggering event or qualifying condition in the base or primary game. In another embodiment, after a player has qualified for a bonus game, the player may subsequently enhance his/her bonus game participation through continued play on the base or primary game. Thus, for each bonus qualifying event, such as a bonus symbol, that the player obtains, a given number of bonus game wagering points or credits may be accumulated in a "bonus meter" programmed to accrue the bonus wagering credits or entries toward eventual participation in a bonus game. The occurrence of multiple such bonus qualifying events in the primary game may result in an arithmetic or exponential increase in the number of bonus wagering credits awarded. In one embodiment, the player may redeem extra bonus wagering credits during the bonus game to extend play of the bonus game.

In one embodiment, no separate entry fee or buy in for a bonus game need be employed. That is, a player may not purchase an entry into a bonus game, rather they must win or earn entry through play of the primary game thus, encouraging play of the primary game. In another embodiment, qualification of the bonus or secondary game is accomplished through a simple "buy in" by the player, for example, if the player has been unsuccessful at qualifying through other specified activities. In another embodiment, the player must make a separate side-wager on the bonus game or wager a designated amount in the primary game to qualify for the secondary game. In this embodiment, the secondary game triggering event must occur and the side-wager (or designated primary game wager amount) must have been placed to trigger the secondary game.

Figure 2B:
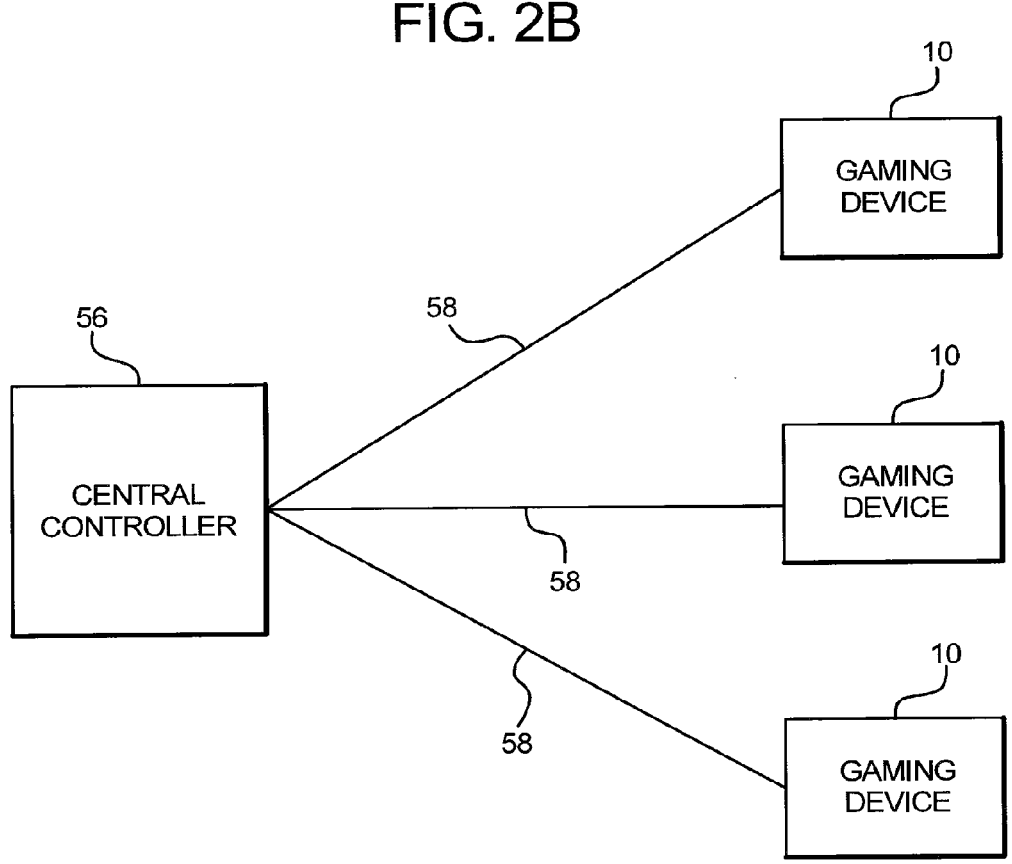
FIG. 2B is a schematic block diagram of one embodiment of a network configuration for a plurality of gaming devices disclosed herein.

In one embodiment, as illustrated in FIG. 2B, one or more of the gaming devices 10 are in communication with each other and/or at least one central server, central controller or remote host 56 through a data network or remote communication link 58. In this embodiment, the central server, central controller or remote host is any suitable server or computing device which includes at least one processor and at least one memory or storage device. In different such embodiments, the central server is a progressive controller or a processor of one of the gaming devices in the gaming system. In these embodiments, the processor of each gaming device is designed to transmit and receive events, messages, commands or any other suitable data or signal between the individual gaming device and the central server. The gaming device processor is operable to execute such communicated events, messages or commands in conjunction with the operation of the gaming device. Moreover, the processor of the central server is designed to transmit and receive events, messages, commands or any other suitable data or signal between the central server and each of the individual gaming devices. The central server processor is operable to execute such communicated events, messages or commands in conjunction with the operation of the central server. It should be appreciated that one, more or each of the functions of the central controller as disclosed herein may be performed by one or more gaming device processors. It should be further appreciated that one, more or each of the functions of one or more gaming device processors as disclosed herein may be performed by the central controller.

In one embodiment, the game outcome provided to the player is determined by a central server or controller and provided to the player at the gaming device. In this embodiment, each of a plurality of such gaming devices are in communication with the central server or controller. Upon a player initiating game play at one of the gaming devices, the initiated gaming device communicates a game outcome request to the central server or controller.

In one embodiment, the central server or controller receives the game outcome request and randomly generates a game outcome for the primary game based on probability data. In another embodiment, the central server or controller randomly generates a game outcome for the secondary game based on probability data. In another embodiment, the central server or controller randomly generates a game outcome for both the primary game and the secondary game based on probability data. In this embodiment, the central server or controller is capable of storing and utilizing program code or other data similar to the processor and memory device of the gaming device.

In an alternative embodiment, the central server or controller maintains one or more predetermined pools or sets of predetermined game outcomes. In this embodiment, the central server or controller receives the game outcome request and independently selects a predetermined game outcome from a set or pool of game outcomes. The central server or controller flags or marks the selected game outcome as used. Once a game outcome is flagged as used, it is prevented from further selection from the set or pool and cannot be selected by the central controller or server upon another wager. The provided game outcome can include a primary game outcome, a secondary game outcome, primary and secondary game outcomes, or a series of game outcomes such as free games.

The central server or controller communicates the generated or selected game outcome to the initiated gaming device. The gaming device receives the generated or selected game outcome and provides the game outcome to the player. In an alternative embodiment, how the generated or selected game outcome is to be presented or displayed to the player, such as a reel symbol combination of a slot machine or a hand of cards dealt in a card game, is also determined by the central server or controller and communicated to the initiated gaming device to be presented or displayed to the player. Central production or control can assist a gaming establishment or other entity in maintaining appropriate records, controlling gaming, reducing and preventing cheating or electronic or other errors, reducing or eliminating win-loss volatility and the like.

In another embodiment, a predetermined game outcome value is determined for each of a plurality of linked or networked gaming devices based on the results of a bingo, keno or lottery game. In this embodiment, each individual gaming device utilizes one or more bingo, keno or lottery games to determine the predetermined game outcome value provided to the player for the interactive game played at that gaming device. In one embodiment, the bingo, keno or lottery game is displayed to the player. In another embodiment, the bingo, keno or lottery game is not displayed to the player, but the results of the bingo, keno or lottery game determine the predetermined game outcome value for the primary or secondary game.

In the various bingo embodiments, as each gaming device is enrolled in the bingo game, such as upon an appropriate wager or engaging an input device, the enrolled gaming device is provided or associated with a different bingo card. Each bingo card consists of a matrix or array of elements, wherein each element is designated with a separate indicia, such as a number. It should be appreciated that each different bingo card includes a different combination of elements. For example, if four bingo cards are provided to four enrolled gaming devices, the same element may be present on all four of the bingo cards while another element may solely be present on one of the bingo cards.

In operation of these embodiments, upon providing or associating a different bingo card to each of a plurality of enrolled gaming devices, the central controller randomly selects or draws, one at a time, a plurality of the elements. As each element is selected, a determination is made for each gaming device as to whether the selected element is present on the bingo card provided to that enrolled gaming device. This determination can be made by the central controller, the gaming device, a combination of the two, or in any other suitable manner. If the selected element is present on the bingo card provided to that enrolled gaming device, that selected element on the provided bingo card is marked or flagged. This process of selecting elements and marking any selected elements on the provided bingo cards continues until one or more predetermined patterns are marked on one or more of the provided bingo cards. It should be appreciated that in one embodiment, the gaming device requires the player to engage a daub button (not shown) to initiate the process of the gaming device marking or flagging any selected elements.

After one or more predetermined patterns are marked on one or more of the provided bingo cards, a game outcome is determined for each of the enrolled gaming devices based, at least in part, on the selected elements on the provided bingo cards. As described above, the game outcome determined for each gaming device enrolled in the bingo game is utilized by that gaming device to determine the predetermined game outcome provided to the player. For example, a first gaming device to have selected elements marked in a predetermined pattern is provided a first outcome of win $10 which will be provided to a first player regardless of how the first player plays in a first game and a second gaming device to have selected elements marked in a different predetermined pattern is provided a second outcome of win $2 which will be provided to a second player regardless of how the second player plays a second game. It should be appreciated that as the process of marking selected elements continues until one or more predetermined patterns are marked, this embodiment ensures that at least one bingo card will win the bingo game and thus at least one enrolled gaming device will provide a predetermined winning game outcome to a player. It should be appreciated that other suitable methods for selecting or determining one or more predetermined game outcomes may be employed.

In one example of the above-described embodiment, the predetermined game outcome may be based on a supplemental award in addition to any award provided for winning the bingo game as described above. In this embodiment, if one or more elements are marked in supplemental patterns within a designated number of drawn elements, a supplemental or intermittent award or value associated with the marked supplemental pattern is provided to the player as part of the predetermined game outcome. For example, if the four corners of a bingo card are marked within the first twenty selected elements, a supplemental award of $10 is provided to the player as part of the predetermined game outcome. It should be appreciated that in this embodiment, the player of a gaming device may be provided a supplemental or intermittent award regardless of if the enrolled gaming device's provided bingo card wins or does not win the bingo game as described above.

In another embodiment, one or more of the gaming devices are in communication with a central server or controller for monitoring purposes only. That is, each individual gaming device randomly generates the game outcomes to be provided to the player and the central server or controller monitors the activities and events occurring on the plurality of gaming devices. In one embodiment, the gaming network includes a real-time or on-line accounting and gaming information system operably coupled to the central server or controller. The accounting and gaming information system of this embodiment includes a player database for storing player profiles, a player tracking module for tracking players and a credit system for providing automated casino transactions.

In one embodiment, the gaming device disclosed herein is associated with or otherwise integrated with one or more player tracking systems. Player tracking systems enable gaming establishments to recognize the value of customer loyalty through identifying frequent customers and rewarding them for their patronage. In one embodiment, the gaming device and/or player tracking system tracks any players gaming activity at the gaming device. In one such embodiment, the gaming device includes at least one card reader 38 in communication with the processor. In this embodiment, a player is issued a player identification card which has an encoded player identification number that uniquely identifies the player. When a player inserts their playing tracking card into the card reader to begin a gaming session, the card reader reads the player identification number off the player tracking card to identify the player. The gaming device and/or associated player tracking system timely tracks any suitable information or data relating to the identified player's gaming session. Directly or via the central controller, the gaming device processor communicates such information to the player tracking system. The gaming device and/or associated player tracking system also timely tracks when a player removes their player tracking card when concluding play for that gaming session. In another embodiment, rather than requiring a player to insert a player tracking card, the gaming device utilizes one or more portable devices carried by a player, such as a cell phone, a radio frequency identification tag or any other suitable wireless device to track when a player begins and ends a gaming session. In another embodiment, the gaming device utilizes any suitable biometric technology or ticket technology to track when a player begins and ends a gaming session.

During one or more gaming sessions, the gaming device and/or player tracking system tracks any suitable information or data, such as any amounts wagered, average wager amounts and/or the time these wagers are placed. In different embodiments, for one or more players, the player tracking system includes the player's account number, the player's card number, the player's first name, the player's surname, the player's preferred name, the player's player tracking ranking, any promotion status associated with the player's player tracking card, the player's address, the player's birthday, the player's anniversary, the player's recent gaming sessions, or any other suitable data. In one embodiment, such tracked information and/or any suitable feature associated with the player tracking system is displayed on a player tracking display 40. In another embodiment, such tracked information and/or any suitable feature associated with the player tracking system is displayed via one or more service windows (not shown) which are displayed on the central display device and/or the upper display device.

In one embodiment, a plurality of the gaming devices are capable of being connected together through a data network. In one embodiment, the data network is a local area network (LAN), in which one or more of the gaming devices are substantially proximate to each other and an on-site central server or controller as in, for example, a gaming establishment or a portion of a gaming establishment. In another embodiment, the data network is a wide area network (WAN) in which one or more of the gaming devices are in communication with at least one off-site central server or controller. In this embodiment, the plurality of gaming devices may be located in a different part of the gaming establishment or within a different gaming establishment than the off-site central server or controller. Thus, the WAN may include an off-site central server or controller and an off-site gaming device located within gaming establishments in the same geographic area, such as a city or state. The WAN gaming system may be substantially identical to the LAN gaming system described above, although the number of gaming devices in each system may vary relative to each other.

In another embodiment, the data network is an internet or intranet. In this embodiment, the operation of the gaming device can be viewed at the gaming device with at least one internet browser. In this embodiment, operation of the gaming device and accumulation of credits may be accomplished with only a connection to the central server or controller (the internet/intranet server) through a conventional phone or other data transmission line, digital subscriber line (DSL), T-1 line, coaxial cable, fiber optic cable, or other suitable connection. In this embodiment, players may access an internet game page from any location where an internet connection and computer, or other internet facilitator is available. The expansion in the number of computers and number and speed of internet connections in recent years increases opportunities for players to play from an ever-increasing number of remote sites. It should be appreciated that enhanced bandwidth of digital wireless communications may render such technology suitable for some or all communications, particularly if such communications are encrypted. Higher data transmission speeds may be useful for enhancing the sophistication and response of the display and interaction with the player.

As mentioned above, in one embodiment, the present disclosure may be employed in a server based gaming system. In one such embodiment, as described above, one or more gaming devices are in communication with a central server or controller. The central server or controller may be any suitable server or computing device which includes at least one processor and a memory or storage device. In alternative embodiments, the central server is a progressive controller or another gaming machine in the gaming system. In one embodiment, the memory device of the central server stores different game programs and instructions, executable by a gaming device processor, to control the gaming device. Each executable game program represents a different game or type of game which may be played on one or more of the gaming devices in the gaming system. Such different games may include the same or substantially the same game play with different pay tables. In different embodiments, the executable game program is for a primary game, a secondary game or both. In another embodiment, the game program may be executable as a secondary game to be played simultaneous with the play of a primary game (which may be downloaded to or fixed on the gaming device) or vice versa.

In this embodiment, each gaming device at least includes one or more display devices and/or one or more input devices for interaction with a player. A local processor, such as the above-described gaming device processor or a processor of a local server, is operable with the display device(s) and/or the input device(s) of one or more of the gaming devices.

In operation, the central controller is operable to communicate one or more of the stored game programs to at least one local processor. In different embodiments, the stored game programs are communicated or delivered by embedding the communicated game program in a device or a component (e.g., a microchip to be inserted in a gaming device), writing the game program on a disc or other media, downloading or streaming the game program over a dedicated data network, internet or a telephone line. After the stored game programs are communicated from the central server, the local processor executes the communicated program to facilitate play of the communicated program by a player through the display device(s) and/or input device(s) of the gaming device. That is, when a game program is communicated to a local processor, the local processor changes the game or type of game played at the gaming device.

In another embodiment, a plurality of gaming devices at one or more gaming sites may be networked to the central server in a progressive configuration, as known in the art, wherein a portion of each wager to initiate a base or primary game may be allocated to one or more progressive awards. In one embodiment, a progressive gaming system host site computer is coupled to a plurality of the central servers at a variety of mutually remote gaming sites for providing a multi-site linked progressive automated gaming system. In one embodiment, a progressive gaming system host site computer may serve gaming devices distributed throughout a number of properties at different geographical locations including, for example, different locations within a city or different cities within a state.

In one embodiment, the progressive gaming system host site computer is maintained for the overall operation and control of the progressive gaming system. In this embodiment, a progressive gaming system host site computer oversees the entire progressive gaming system and is the master for computing all progressive jackpots. All participating gaming sites report to, and receive information from, the progressive gaming system host site computer. Each central server computer is responsible for all data communication between the gaming device hardware and software and the progressive gaming system host site computer. In one embodiment, an individual gaming machine may trigger a progressive award win. In another embodiment, a central server (or the progressive gaming system host site computer) determines when a progressive award win is triggered. In another embodiment, an individual gaming machine and a central controller (or progressive gaming system host site computer) work in conjunction with each other to determine when a progressive win is triggered, for example through an individual gaming machine meeting a predetermined requirement established by the central controller.

In one embodiment, a progressive award win is triggered based on one or more game play events, such as a symbol-driven trigger. In other embodiments, the progressive award triggering event or qualifying condition may be by exceeding a certain amount of game play (such as number of games, number of credits, or amount of time), or reaching a specified number of points earned during game play. In another embodiment, a gaming device is randomly or apparently randomly selected to provide a player of that gaming device one or more progressive awards. In one such embodiment, the gaming device does not provide any apparent reasons to the player for winning a progressive award, wherein winning the progressive award is not triggered by an event in or based specifically on any of the plays of any primary game. That is, a player is provided a progressive award without any explanation or alternatively with simple explanations. In another embodiment, a player is provided a progressive award at least partially based on a game triggered or symbol triggered event, such as at least partially based on the play of a primary game.

In one embodiment, one or more of the progressive awards are each funded via a side bet or side wager. In this embodiment, a player must place or wager a side bet to be eligible to win the progressive award associated with the side bet. In one embodiment, the player must place the maximum bet and the side bet to be eligible to win one of the progressive awards. In another embodiment, if the player places or wagers the required side bet, the player may wager at any credit amount during the primary game (i.e., the player need not place the maximum bet and the side bet to be eligible to win one of the progressive awards). In one such embodiment, the greater the player's wager (in addition to the placed side bet), the greater the odds or probability that the player will win one of the progressive awards. It should be appreciated that one or more of the progressive awards may each be funded, at least in part, based on the wagers placed on the primary games of the gaming machines in the gaming system, via a gaming establishment or via any suitable manner.

In another embodiment, one or more of the progressive awards are partially funded via a side-bet or side-wager which the player may make (and which may be tracked via a side-bet meter). In one embodiment, one or more of the progressive awards are funded with only side-bets or side-wagers placed. In another embodiment, one or more of the progressive awards are funded based on player's wagers as described above as well as any side-bets or side-wagers placed.

In one alternative embodiment, a minimum wager level is required for a gaming device to qualify to be selected to obtain one of the progressive awards. In one embodiment, this minimum wager level is the maximum wager level for the primary game in the gaming machine. In another embodiment, no minimum wager level is required for a gaming machine to qualify to be selected to obtain one of the progressive awards.

In another embodiment, a plurality of players at a plurality of linked gaming devices in a gaming system participate in a group gaming environment. In one embodiment, a plurality of players at a plurality of linked gaming devices work in conjunction with one another, such as playing together as a team or group, to win one or more awards. In one such embodiment, any award won by the group is shared, either equally or based on any suitable criteria, amongst the different players of the group. In another embodiment, a plurality of players at a plurality of linked gaming devices compete against one another for one or more awards. In one such embodiment, a plurality of players at a plurality of linked gaming devices participate in a gaming tournament for one or more awards. In another embodiment, a plurality of players at a plurality of linked gaming devices play for one or more awards wherein an outcome generated by one gaming device affects the outcomes generated by one or more linked gaming devices.

Secondary Team Game with Prize Game Board

Referring now to FIG. 3A, one embodiment of the present disclosure operates according to sequence 100. In one embodiment, the gaming system of the present disclosure includes a central server or controller configured to communicate with or link to a plurality of gaming machines or gaming devices. Another embodiment of the present disclosure provides a gaming system having a plurality of linked gaming devices where one of the gaming devices functions as the central server or controller. Each of the gaming devices includes at least one primary or base game operable upon a wager by a player. In some embodiments, each gaming device has one or a plurality of different primary games. In various embodiments, the primary games of each gaming device or a plurality of the gaming devices are the same games or different games. The gaming system further includes at least one secondary team game. In one such embodiment, the secondary team game is associated with a plurality of positions, including at least one winning position and at least one non-winning position.

More specifically, as indicated by block 102, the gaming devices of the gaming system enable players to place wagers on plays of the primary games. In one embodiment, players playing the gaming devices in the gaming system have the opportunity to participate in the secondary team game, as indicated by block 104. In one such embodiment, for a player to participate in the secondary team game, the player must register for team play. In various embodiments, the player may self-register at his or her gaming device, at the customer service desk, at the player club desk, at a kiosk, or in any other suitable manner. In various embodiments, a gaming establishment employee may register one or more players for team play at the customer service desk, at the player club desk, at a kiosk, or in any other suitable manner. In these embodiments, once a player registers for team play, that player may be assigned ID information for security purposes. For example, the player may be assigned a user name and a PIN. Alternatively, the player may be required to swipe his or her player tracking card. Once logged in, the player can check status and other information related to team play.

In one embodiment, players must achieve one or more designated qualifying conditions to participate in the secondary team game. It should be appreciated that any suitable qualifier or qualification or combination of qualifications may be employed to determine a player's eligibility for team play. In one such embodiment, a method or characteristic of a player's game play or gaming activity qualifies the player for team play. In one such embodiment, the amount a player wagers determines whether the player is qualified to participate in the secondary team game. The wager qualification amount may be measured in any suitable manner.

In one embodiment, the wager qualification amount is determined by the amount a player wagers (i.e., a player's coin-in) on a single gaming device during uninterrupted game play. In another embodiment, the wager qualification amount is determined by the amount the player wagers at any gaming machine of the gaming system in an allotted time period, such as 24 hours. In another embodiment, the wager qualification amount is determined by the amount wagered on particular gaming devices or at particular gaming establishments. In another embodiment, the team play qualifier is based on the average wager per spin of the reels or play of the game.

In one embodiment, the amount a player wins determines whether the player qualifies to participate in the secondary team game. The qualification win amount may be measured in any suitable manner. In one such embodiment, the qualification win amount is determined by the amount a player wins on a single gaming device during game play. In another embodiment, the qualification win amount is determined by the amount the player wins in a designated time period, such as 24 hours. In another embodiment, the qualification win amount is determined by the amount the player wins in a certain type of game for a certain amount of time, such as the amount in slot games over a week.

In one embodiment, the amount of jackpot awards won by a player or winning a particular jackpot award determines whether the player qualifies to participate in the secondary team game. In one embodiment, winning a designated jackpot qualifies the player to participate in the secondary team game. In another embodiment, winning a certain amount from one or more jackpots qualifies the player to participate in the secondary team game. It should be appreciated that a jackpot qualifier may be determined in any suitable manner.

In one embodiment, the total amount lost by a player over a certain time period determines whether the player qualifies to participate in the secondary team game. In one embodiment, losing a designated amount qualifies the player for team play. In another type of tournament, losing a certain number of spins in a row qualifies the player for team play. This provides players with an incentive to continue playing after hitting a period of bad luck.

In various embodiments, certain game events qualify the player to participate in the secondary team game. In one embodiment, achieving a certain game score qualifies the player for team play. In another embodiment, playing a game for a certain amount of time qualifies the player for team play. In one embodiment, the gaming system enables the player to participate in the secondary team game as a bonus award. In another embodiment, a player may win entry into the secondary team game as an award in a primary or bonus game. It should be appreciated that the gaming system may determine qualification for the secondary team game based on any element or combinations of elements in any game.

In one embodiment, the qualifying condition for team play is determined based on one or more characteristics from a player tracking system or account. For example, all players of a certain rank or level may qualify for team play. In another embodiment, all new members to a player tracking system or gaming establishment receive an automatic entry into the secondary team game. In another embodiment, on a player's birthday, the gaming system enables the player to participate in the secondary team game. In another embodiment, on a player's anniversary in the player system, the gaming system enables the player to participate in the secondary team game. In one embodiment, a player tracking system includes point intervals and each time a player reaches a point interval, the player can participate the secondary team game.

In certain embodiments, the player is not required to pay an entry fee to participate in team play. In other embodiments, players must pay an entry fee to participate in the secondary team game. In one embodiment, the gaming system requires each player to pay a certain amount of money or credits to enter the secondary team game. It should be appreciated that the entry fee may be any suitable form of payment. In one embodiment, the gaming system requires the player to pay a certain amount of promotional credits which are gaming establishment funded wagering credits to enter the secondary team game. In another embodiment, the gaming system requires the player to pay a certain amount of coupons, which are redeemable and offered to the general public to enter the secondary team game. For example, in the hotel affiliated with the gaming establishment, players receive coupons or tickets to enter the secondary team game. In one such embodiment, players enter the coupons or tickets into their respective gaming devices to play the team game. In another embodiment, the gaming system requires the player to pay a certain amount of gift certificates to enter the secondary team game. In another embodiment, the gaming system requires the player to pay a certain amount in vouchers to enter the secondary team game. In another embodiment, instead of paying a fee, a player may use player tracking points to enter a secondary team game. In one embodiment, player tracking points are they only way to enter a secondary team game. It should be appreciated that the player may pay the entry fee for the secondary team game at one of the gaming machines directly, for example, by using a credit card.

It should be appreciated that the gaming system can implement any buy in or entry fee for the secondary team game in any suitable manner. It should also be appreciated that in one embodiment, some players must pay an entry fee but other players do not. In one embodiment, the amount of the secondary team game entry fee is based on the player's rank in a player tracking system. For example, a player of a platinum rank in a player tracking system does not have to pay an entry fee and a player of a gold rank must use 50 player points to enroll in the tournament.

In one embodiment, the fee is automatically deducted from the player's account once the player registers for the secondary team game. In one embodiment, this automated buy in is an option that a player may select when registering for the secondary team game.

The qualifications and entry fees of the secondary team game may be based any suitable elements and may be configured in any suitable manner.

It should be appreciated that the gaming system may require players to meet one or more designated qualifying conditions to join or switch into certain teams in the secondary game. Any suitable qualification or combination of qualifications may be employed to determine a player's eligibility to join certain teams. For example, in one embodiment, a player's eligibility to join certain teams of the secondary game is based on a wager amount placed by the player.

Referring again to FIG. 3A, as indicated by block 106, the gaming system enables each player participating in the secondary team game to join one of a plurality of teams associated with the secondary team game. Each of the teams associated with the secondary game includes or is capable of including a plurality of players at any given time. Players can join a team in a number of different ways. In one embodiment, a player can initially choose a team upon that player registering and/or qualifying for team play. In one such embodiment, the player's gaming device prompts the player to choose a team that the player wants to join. In one embodiment, the each team's current position or standing in the secondary team game is displayed to the player when the player is making the choice of which team to join. Thus, the gaming system enables a player to strategically choose which team the player wants to join based on the team's standing in the secondary game. In another embodiment, the player cannot see where each of the teams stands in the secondary team game when joining a team. In different embodiments, players may be invited to join a team or assigned to a default team upon choosing and/or qualifying to participate in team play.

In one embodiment of the present disclosure, the gaming system enables players to manage their team membership and compete in the secondary team game without having to be in the casino or gaming establishment. In one such embodiment, an Internet component is associated with the secondary team game. In one such embodiment, the gaming system enables players to manage their team membership and compete in the secondary team game by visiting a website. In such embodiments, the gaming system enables players to join teams or switch teams even if they are not in the casino. In one embodiment, the website may offer additional features to the player including, but not limited to, gaming, advertisements, shopping or any other desired feature. In certain embodiments, there may be participation requirements associated with using the website to participate in team play. For example, to remain an active member of the team, a player may be required to log in every so often, view a designated number of ads, make a designated number of purchases, or meet any another suitable requirement.

Referring again to FIG. 3A, as the players play the primary games of the gaming devices, the gaming system monitors at least one factor of each player's gaming activity to determine a score or rank for that player, as indicated by block 108. In one embodiment, the factors which may be monitored include: (1) a total amount of money wagered by the players on the team (i.e., coin in totals); (2) time; (3) player status; (4) events that occur during primary game play, such as but not limited to symbol combinations generated during game play, a designated number of wins obtained during game play, a designated number of losses obtained during game play, exceeding a certain amount of game play (e.g., number of games, number of credits, amount of time), and reaching a specified number of points earned during game play; (5) any other suitable factor; and (6) any combination of these. In various embodiments, the gaming system determines player scores based on various aspects of each player's game play, such that a player is not penalized for wagering in low denominations or wagering less frequently than other players.

As indicated by block 110, for each of the teams, the gaming system determines a cumulative score or rank based on the player scores or ranks for each player on that team. Each team's cumulative score or rank is periodically determined or sampled. In one embodiment, a time period is set for the cumulative score to be determined. The game operator has the ability to define the time period in any manner they choose. In various embodiments, the time period is determined randomly or is set to certain predetermined intervals. For example, in one embodiment, the cumulative score for each team is determined in one-hour time intervals. When the time period is met, the cumulative score for each team is determined.

After the gaming system determines the cumulative scores or ranks for the teams in the secondary game, the gaming system uses the cumulative score or rank for each team to determine how that team progresses in the secondary team game. More specifically, as indicated by block 112 of FIG. 3A, the gaming system associates a position of the secondary team game with each team based on the determined cumulative score for that team. If any of the teams are associated with a winning position, the gaming system awards prizes to one or more players on each team associated with one of the winning positions, as indicated by block 114.

Figure 3B:
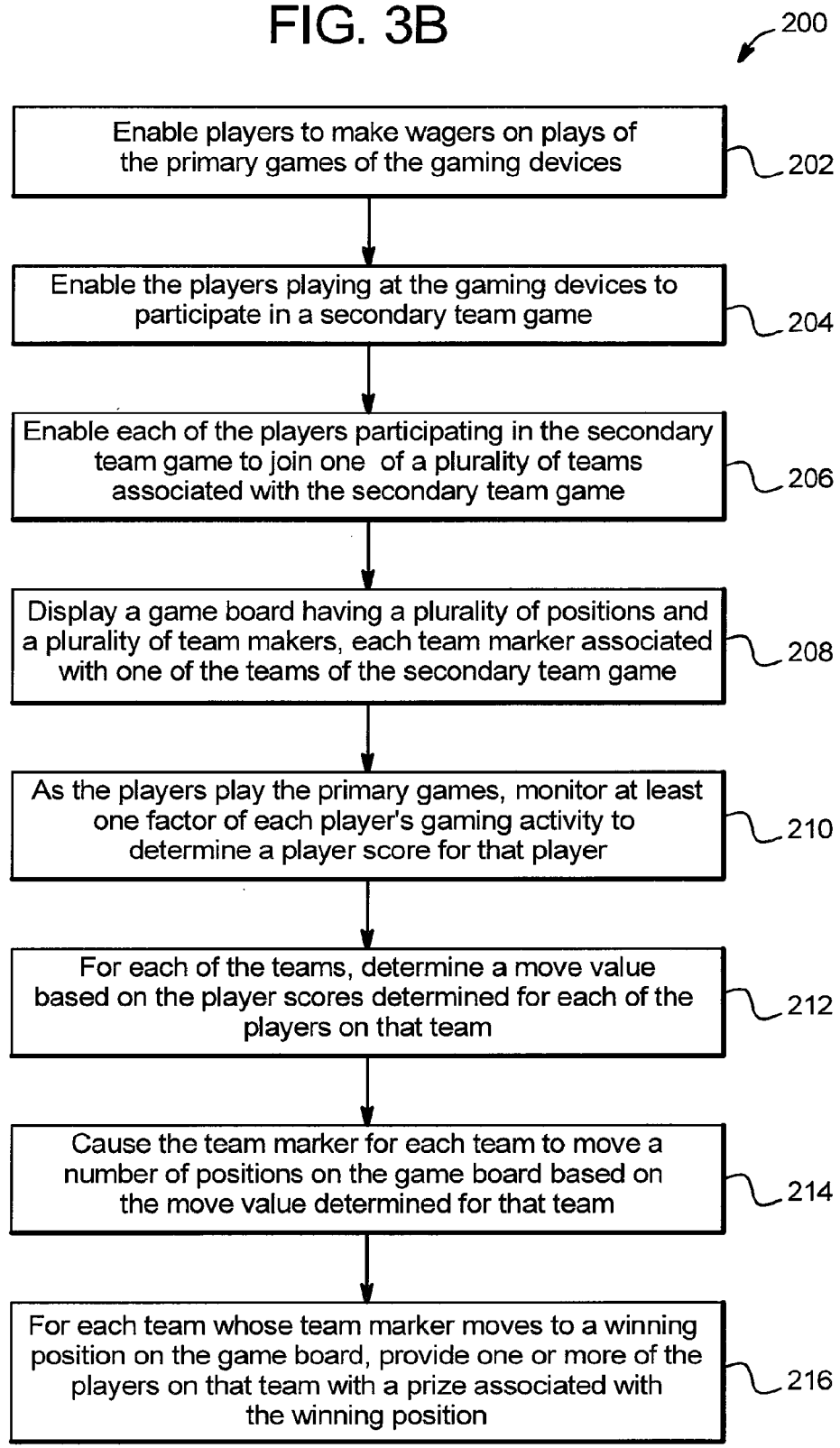
FIG. 3B is a flow chart illustrating another embodiment of the present disclosure.

Referring now to FIG. 3B, one embodiment of the present disclosure operates according to sequence 200. In one embodiment, the secondary game is associated with a community, group or team display device. The community, group or team display device includes a plurality of positions or locations wherein at least one of the positions or locations is associated with an award. In one such embodiment, the secondary team game is associated with a game board having a plurality of positions which include at least one winning position and at least one non-winning position. The winning positions are each associated with at least one prize.

As indicated by block 202, the gaming system operates with the gaming devices to enable the players to make wagers on plays of the primary games. The gaming system enables the players at the gaming devices to participate in the secondary team game, as indicated by block 204. For those players who wish to participate in the secondary team game, the gaming system enables the players to join one of a plurality of teams associated with the secondary team game, as indicated by block 206.

As indicated by block 208, the gaming system displays a game board having a plurality of positions to the players. Each team is represented by a marker on the game board. The game board monitors and displays each team's progress in the secondary team game. It should be appreciated that, in one embodiment, the secondary team game and any information relating to the secondary team game, such as the game board, is displayed to each player on his or her individual gaming device. In other embodiments, instead of or in addition to displaying the secondary team game on the individual gaming devices, the gaming system is associated with a shared display configured to display information relating to the secondary team game, as will be discussed below.

As the players play the primary games of the gaming devices, the gaming system monitors at least one factor of each player's gaming activity to determine a score for that player, as indicated by block 210. The gaming system determines a move value for each team based on the player scores for each player of that team, as indicated by block 212.

As indicated by block 214, the gaming system causes each team's marker to move a certain number of spaces or positions on the game board based on the move value determined for that team. For each team whose marker moves to a winning position on the game board, the gaming system provides one or more players on that team with a prize associated with the winning position on which the team's marker landed, as indicated by block 216. In one alternative embodiment, rather than requiring a team's marker to land directly on one of the winning positions of the game board, prizes become available to the members of a team when that team's marker passes a winning position.

It should be appreciated that, in such embodiments, the secondary team game may include any suitable type of game where markers representing different teams move to or accumulate positions on a game board. For example, the secondary team game could include: (a) a treasure map game or geographical map game, where teams accumulate or move to various points on the map; (b) a bingo game, where teams accumulate positions on a bingo card; (c) a lottery game, where teams accumulate symbols or numbers on a lottery card; (d) a racing game, where teams progress along a track; (e) a game in which teams advance along one or more paths; (f) a wheel game, where teams accumulate sections or indicators associated with the wheel; and (g) any other suitable type of game. In other embodiments, the secondary team game may include any other suitable type of game and is not limited to games which include game boards.

In one embodiment of the present disclosure, the gaming system enables players to change their team membership at any suitable or designated time during the secondary team game. In this manner, the gaming system enables players to use strategy to try to align themselves with the team they feel has the best chance of winning the prize they want. However, the change of teams does not guarantee a chance of winning, as other players' decisions can affect each individual player's strategy. Since the players may not know the factors being monitored to determine the players' scores, they can only guess where each team's marker will move next. For example, if too many players join a team thereby causing the total coin-in to increase for that team, the cumulative score for that particular team may suddenly and dramatically increase the next time it is sampled by the gaming system. This could cause the team's marker to overshoot or otherwise miss a winning position.

To estimate where a team's marker will move next, players formulate guesses based on how many people they think are on the team and how they believe the cumulative scores are being determined. Based on this estimation, a player joins the team that he feels will land on a prize or land on the prize he wants.

In one embodiment, when a team's marker lands on one of the winning positions, the individual members of that team must claim their prizes. The game operator determines how many prizes are available for each winning position. The number of prizes available may be less than or equal to the number of members on the team. In one embodiment, the prizes that are available are queued and transferred to winning positions to replace outgoing prizes in a first in-first out manner. Thus, players have a degree of uncertainty as to which positions are associated with which prizes.

In one embodiment, the players on a winning team claim prizes on a first-come, first serve basis. In another embodiment, a player's status determines when that player can claim prize or how many prizes are available to that player. For example, if the team's marker lands on a winning position, platinum players may be given the ability to claim the prize first while bronze players may have to wait 30 seconds before making a claim. Alternatively, if the team's marker lands on a winning position and fifteen prizes are available, seven may be available to platinum members, five may be available to gold players and three may be available to bronze players. In one embodiment, a player's gaming activity must sustain a predetermined level for that player to claim a prize.

In one embodiment, the gaming system pays out prizes to the player directly at the gaming device. In one example embodiment, instead of having to leave the gaming machine to redeem a prize, the gaming device and gaming system may credit the player's account for the win. Alternatively, gaming device and gaming system may provide the player a ticket to redeem the prize at a later point in time.

In one embodiment, each player who is on a winning team receives an award or prize. In one such embodiment, each player is provided with a minimum or default win amount. Any other prizes or awards associated with the winning position on which the team lands are provided to one or more players on the winning team in addition to the default win amount.

In one embodiment, points are given to each player who is a member of a prize-winning team. These points may be awarded to players who do not receive a prize or may be awarded to all team members. These points may have any number of applications, such as a running tournament (i.e., the player who accumulates the most points in a certain time period wins), player club points, cash-in value, or any other desired feature. In one embodiment, players who are controlling and tracking their progress from the Internet are awarded points only and are not eligible to claim prizes.

One embodiment of the present disclosure allows the player to interact with a service window. In one embodiment, players may check their team standing, performance, and any available and/or upcoming prizes in the service window on participating gaming devices or at kiosks. In one embodiment, players can claim any available prizes through the player service window. In one embodiment, players participating in team play will be notified by the service window if their team has landed on a winning position. The player is then able to make a claim for a prize immediately. If the player is successful, they must visit a prize kiosk to claim the prize. If the prize is a cash prize, points, game play or other suitable prize, the prize may be downloaded to the game for use or delivered directly to the player's account.

FIGS. 4A, 4B, 4C, 4D, 4E, 4F, and 4G illustrate one example of the secondary team game of the present disclosure which includes five teams—Teams A, B, C, D, and E—each represented by a team marker on a game board. Each of the teams is associated with a path on the game board. Each team's marker moves along its path during the secondary team game.

Figure 4A:
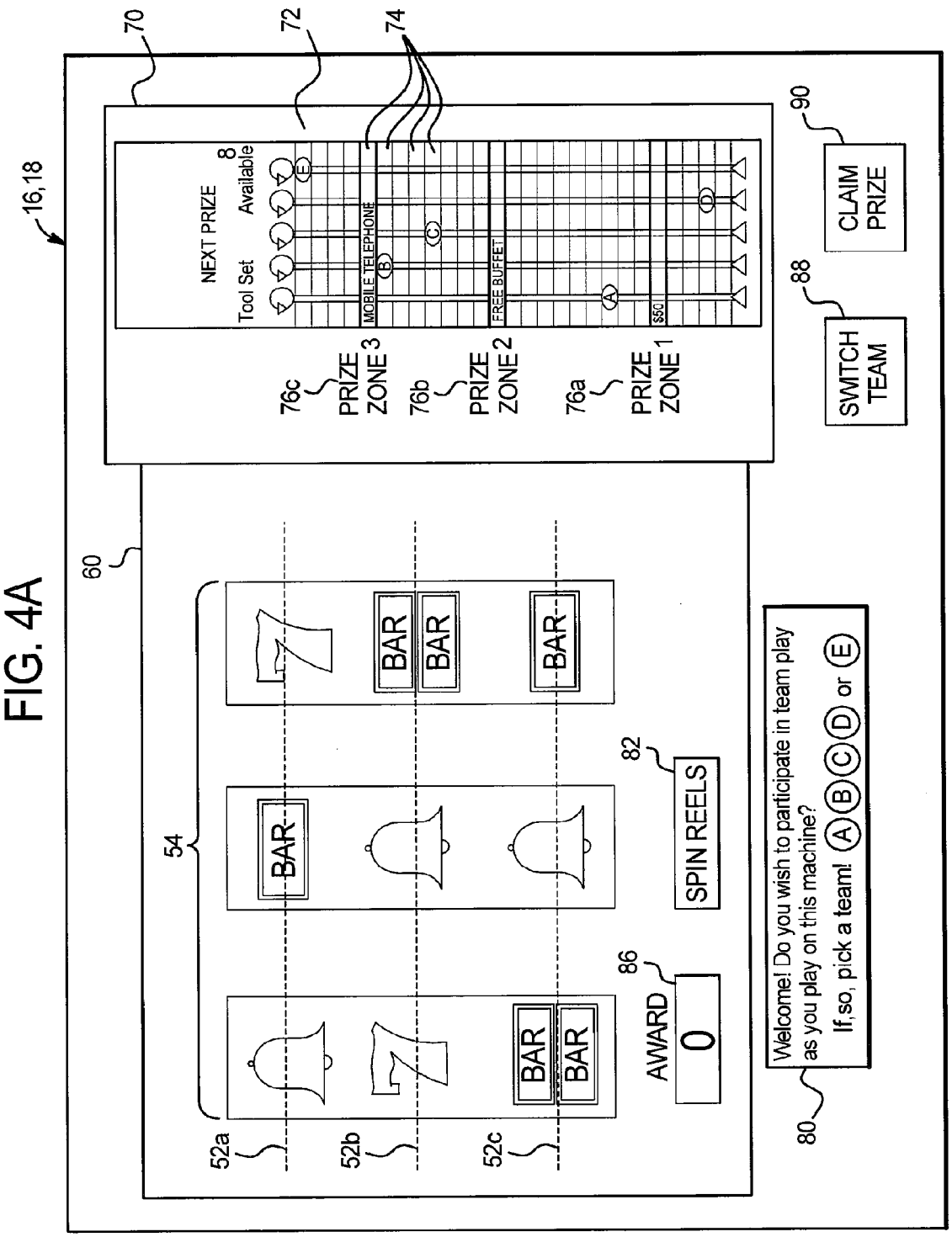

FIG. 4A illustrates the display device 16 of a first player 84 playing at one of the gaming devices in the gaming system. The display device 16 includes a primary game display 60 which includes a plurality of reels 54 associated with a plurality of paylines 52a, 52b, and 52c. The display device 16 also includes a spin reels button 82 and an award meter 86. The award meter 86 shows the number zero, indicating that the player 84 has not yet won an award in the primary game. The display device 16 further includes a message box 80 for providing information regarding game play.

In addition to the primary game display 60, the display device 16 provides a separate display window 70 for displaying information relating to the secondary team game. More specifically, the display window 70 displays the game board 72 associated with the secondary team game for tracking the progress of each team during the secondary team game. The game board 72 includes a plurality of positions 74. Some of the positions are in Prize Zones 76a, 76b, and 76c. The positions located in the Prize Zones 76a, 76b, and 76c are associated with prizes or awards. If a team's marker lands on a position in one of the Prize Zones 76a, 76b, and 76c, one or more of the players on that team become eligible to claim the prize associated with that position.

The game board 72 displays the prizes that are currently active and available for winning in the secondary game. For example, the positions in Prize Zone 1 76a are currently associated with a prize of $50. The positions in Prize Zone 2 76b are associated with a free buffet. The positions in Prize Zone 3 76c are associated with a mobile telephone prize. The other positions on the game board (i.e., the prizes not located in one of the Prize Zones 76a, 76b, and 76c) are not associated with prizes. In one embodiment, as the prizes are awarded to players on winning teams, new prizes appear on the game board 72 and become available. In one such embodiment, the game board 72 displays the prizes that will be available next in one or more of the Prize Zones 76a, 76b, and 76c. As seen in FIG. 4A, the top of display window 70 indicates that a tool set will be the next available prize.

When the player sits down to play at the gaming device, or upon any other suitable triggering event, the gaming device enables the player to participate in the secondary team game. In FIG. 4A, the gaming device displays a message in the message box 80 asking the player if he wishes to participate in team play. The gaming device prompts the player to choose a team to join from the available teams in the secondary team game—Team A, Team B, Team C, Team D, or Team E.

Figure 4B:
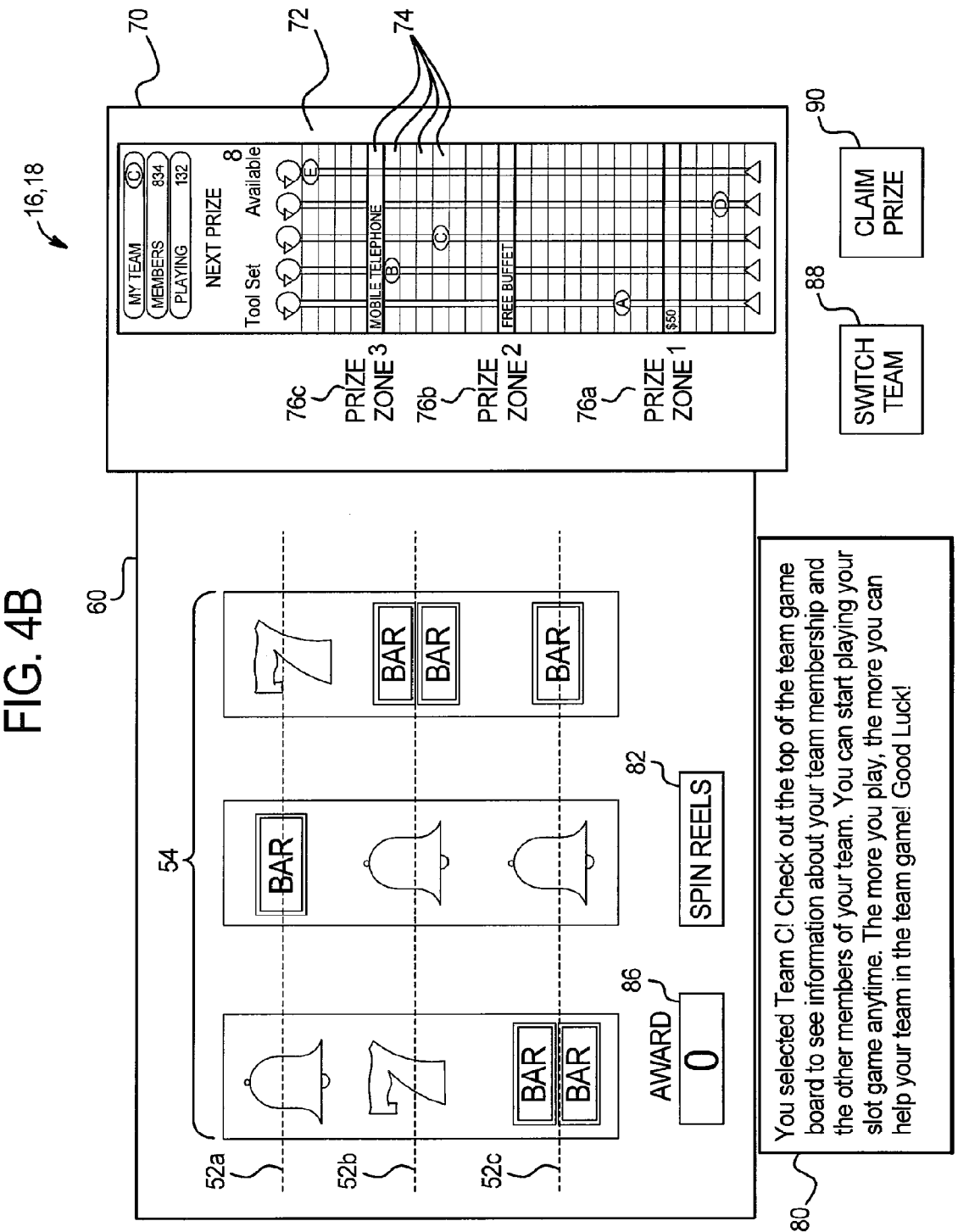

As illustrated in FIG. 4B, the player selected team C, and gaming device displays a message in the message box 80 indicating that the player has elected to join team C. Information about the player's team membership, the number of players on team C, and the number of team C members who are currently playing is displayed to the player at the top of display area 70. The gaming device prompts the player 84 to begin making wagers on plays of the primary game. It should be appreciated that other players playing at the gaming devices of the gaming system are also playing their respective primary games. Some of these players may be on the same team as the player (i.e., team C), and some of the players may be on different teams.

As the players play the primary games of the gaming device, the gaming system monitors at least one factor of each player's gaming activity over a designated period of time. For example, each hour, the gaming system monitors the total amount wagered by a player. The gaming system combines the total amount wagered by the player with the total amounts wagered by each of the other team C players in that hour to determine a cumulative team value for team C. Each team's movement on the game board occurs in increments determined based on the cumulative team value determined for that team. That is, the team marker representing each team moves a designated number of positions on the game board based on the cumulative team value. For example, the gaming system may require the members of a team to collectively wager $1000 to move that team's marker one position on the game board. The gaming device evaluates the teams gaming activity each hour. The gaming device determines that, in the one hour time period, the members of the team have wagered a total of $2000. Thus, the team's marker will move two positions on the game board. It should be appreciated that, in different embodiments, the gaming system may monitor and determine the cumulative team values at random times, upon designated triggering events, at predetermined time intervals, or in any other suitable manner, as desired by the gaming system operator. It should also be appreciated that, once a team's cumulative team value is determined, the number of positions that the team's marker will move on the game board may be randomly determined, predetermined, or determined in any other suitable manner.

Figure 4C:
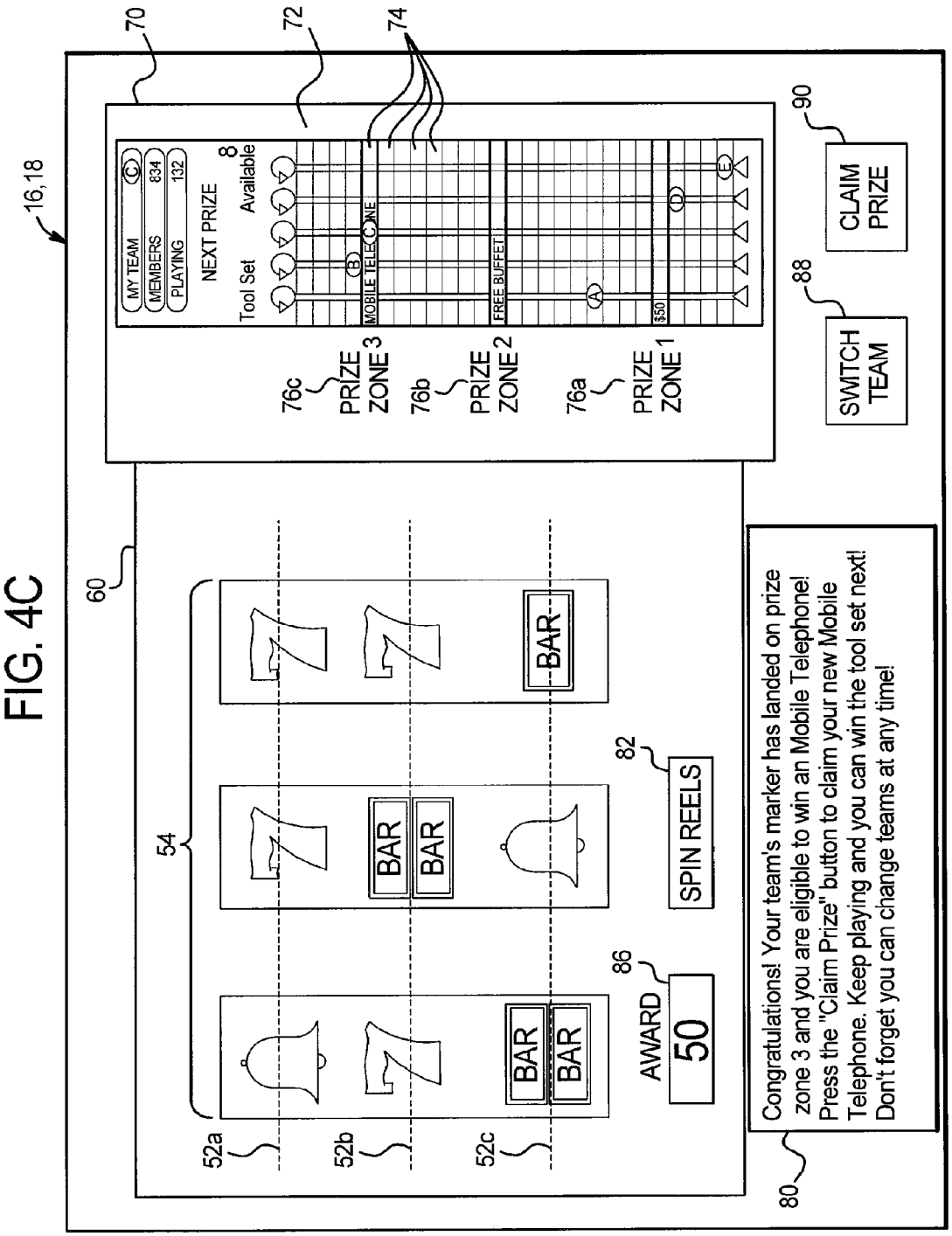

FIG. 4C illustrates the display device at a later point in the player's gaming session. As indicated by the award meter 86, the player has won a total of 50 credits through playing the primary game. In addition, team C's marker has moved onto one of the positions in Prize Zone 3 76c. The positions in Prize Zone 3 76c are associated with a mobile telephone prize. The gaming device displays a message in the message box 80 congratulating the player and prompting the player to press the claim prize input or button 90 to claim the mobile telephone. As indicated at the top of display window 70, the next prize that will enter Prize Zone 3 76c is a tool set. Since Team C has won the mobile telephone prize, the tool set prize will take the place of the mobile telephone prize in Prize Zone 3 76c. Thus, the players on the next team to land in a position located in with Prize Zone 3 76c, will have the chance to win the tool set.

In FIG. 4C, the gaming device further notifies the player in the message box 80 that the player can switch teams at any time. The player's team, team C, has just landed on a prize winning position. Therefore, it may take a long time for team C's marker to move to another winning position. Accordingly, the gaming device is reminding the player that the player can use strategy to join another team that is closer to winning a prize.

Figure 4D:
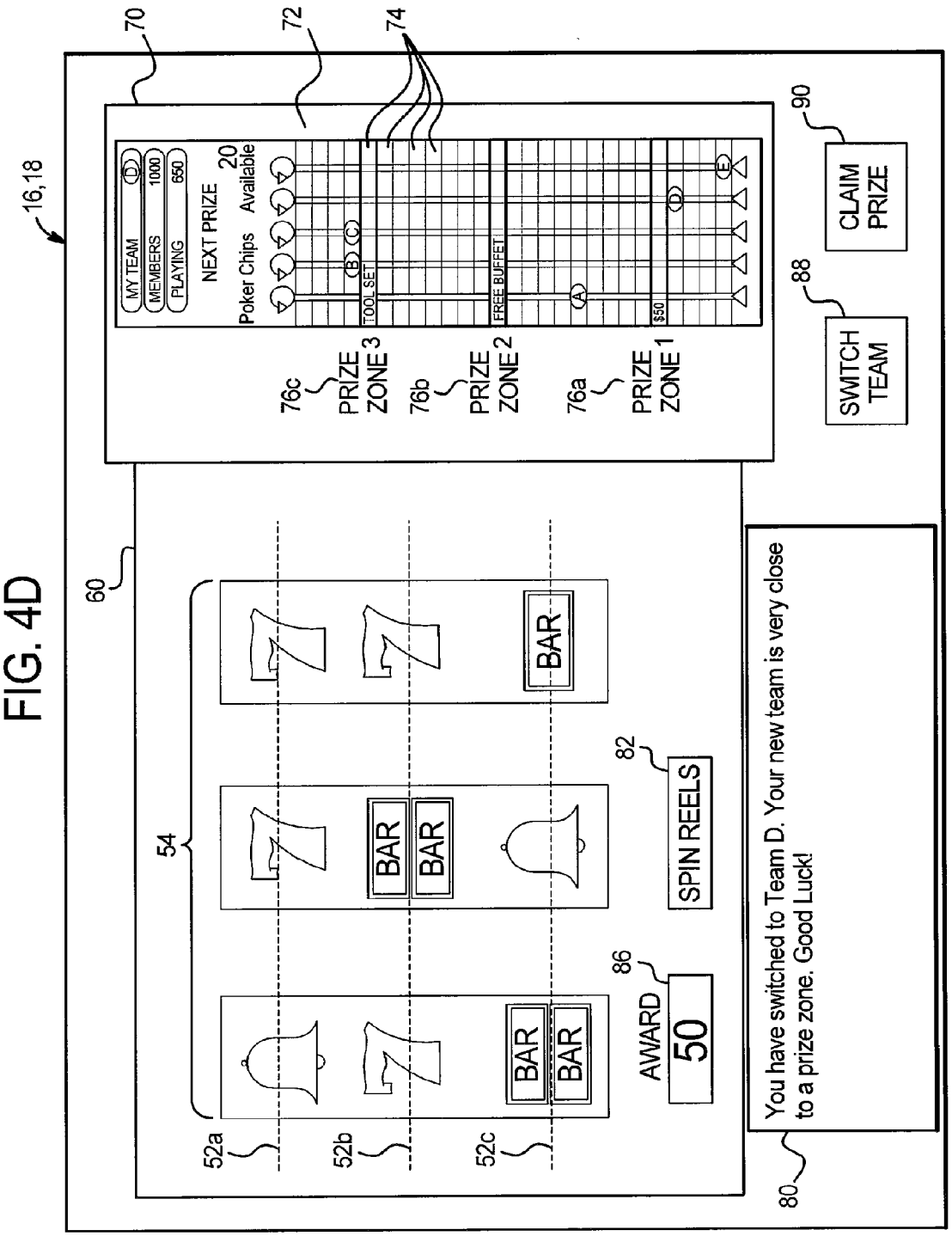

As seen in FIG. 4D, the player has switched teams by activating the switch teams input or button 88. The gaming device displays a message in the message box 80, indicating that the player elected to switch from team C to team D. In certain embodiments, the player can choose the specific team he wants to join. In other embodiments, the player can choose to switch off of his current team, but the gaming system randomly assigns the player to a new team. The game board 72 shows that team D's marker is very close to landing on one of the positions in Prize Zone 1 76a, which is associated with a prize of $50. At the top of display window 70, information regarding the player's new team membership, the number of players on team D, and the number of those players currently playing is displayed to the player. Team D includes 100 players, of which 650 are currently playing.

In FIG. 4E, the player continues to play and win awards in the primary game, as indicated by the award meter 86, which now shows the number 75. The game board 72 shows that the marker for team D has advanced to a position beyond Prize Zone 1 76a. That is, the team D marker overshot the prize-winning position in Prize Zone 1 76a. This may have been caused by the large number of players on team D who are currently playing on the gaming devices. Accordingly, the gaming device displays a message in the message box 80 informing the player that team D's marker just missed Prize Zone 1 76a. The player can either stay on team D and go for the next prize in Prize Zone 2 76b (i.e., the free buffet), or the player can switch teams again to try to join a team that is closer to landing on a prize-winning position.

In FIG. 4F, the player has switched teams for a second time by activating the switch teams button 88. The gaming device displays a message in the message box 80, indicating that the player elected to switch from team D to team E. The game board 72 shows that team E's marker is very close to landing on one of the positions in Prize Zone 1 76a, which is still associated with a prize of $50 since no other team has landed on Prize Zone 1 76a. At the top of display window 70, information regarding the player's new team membership, the number of players on team E, and the number of those players currently playing is displayed to the player. Team E includes 750 players, of which 250 are currently playing.

As seen in FIG. 4G, the player continues to play and win awards in the primary game, as indicated by the award meter 86, which now shows the number 100. In addition, the game board 72 shows that the marker for team E has moved along its path and landed on the position in Prize Zone 1 76a. Accordingly, the gaming device displays a message in the message box 80 prompting the player to press the claim prize input or button 90 to claim the $50 prize associated with Prize Zone 1 76a.

It should be appreciated that, just because team E was very close to winning the prize in Prize Zone 1 76a when the player joined team E, there was no guarantee that team E's marker would actually land on the winning position in Prize Zone 1 76a. If team E's marker had overshot Prize Zone 1 76a, the player could have stayed on team E in hopes of team E's marker landing on the position associated with Prize Zone 2 76b. If Team E's marker were to overshoot both Prize Zones 1 and 2, the player could still win the prize(s) associated with Prize Zone 3 76c two times in a row.

The example of FIGS. 4A, 4B, 4C, 4D, 4E, 4F, and 4G demonstrates how a player can play the primary game of his or her gaming device while simultaneously participating in team play. As the player plays the primary game, the player can see information relating to a secondary team game on his or her individual gaming device.

It should be appreciated that in other embodiments, instead of or in addition to displaying information about the secondary team game on individual gaming devices, the gaming system is associated with a shared display configured to display information relating to the secondary team game, such as a game board and the team markers moving on the game board. In one such embodiment, the shared display is connected to or is adjacent to a plurality or all of the gaming devices of the gaming system. In one embodiment, the gaming devices are positioned and spaced apart substantially equally about the shared display.

As illustrated in FIG. 5, a plurality of gaming devices 10a, 10b, and 10c are associated with a common or shared display 224 configured to display information relating to the secondary team game. Each of the gaming devices 10a, 10b, and 10c includes a primary game 220a, 220b, and 220c operable upon a wager by a player. In different embodiments, one or more of the primary games 220a, 220b, and 220c may be the same games or different games. As seen in FIG. 5, gaming devices 10a and 10b each include a primary game of slot, while gaming device 10c includes a card game. In this example, each of the players playing at the gaming devices 10a, 10b, and 10c can see the game board of the secondary team game on the shared display 224. The player playing at gaming device 10a is a member of team A, the player playing at gaming device 10b is a member of team B, and the player playing at gaming device 10c is a member of team C. The gaming devices 10a, 10b, and 10c provide and display information to the individual players regarding their teams' progress and standing in the secondary team game. For example, gaming device 10c displays a message indicating that Team C has landed on a prize-winning position on the game board.

In another embodiment, if the team marker lands on certain designated spaces, the members of the team associated with the team marker are provided awards. In one such embodiment, these designated spaces are specific to the team marker. For example, if a first team marker lands on a designated space associated with the first team, the members of that team are provided an award. In this example, if a second team marker lands on the designated space associated with the first team, the members of the second team are not provided an award.

In another embodiment, one or more positions on the board are associated with advances, wherein if a team marker lands on a position associated with an advance, the team marker is advanced a designated number of positions. In another embodiment, one or more positions on the board are associated with set-backs, wherein if a team marker lands on a position associated with a set-back, the team marker moves back a designated number of positions. In these embodiments, the designated number of positions the team marker is advanced or set-back is predetermined, randomly determined, determined based on one or more player statuses (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

In another embodiment, one or more positions on the board are switch positions, wherein if a team marker lands on such a position, the team marker switches position with another team marker on the board. For example, if a team in third-place lands on a switch-to-first-place position, the team marker switches position with the marker in first place. In different embodiments, if a first team marker lands on a switch position, which other team marker that first team marker switches positions with is predetermined, randomly determined, determined based on one or more player statuses (such as determined through a player tracking system), determined based on a generated symbol or symbol combination, determined based on a random determination by the central controller, determined based on a random determination at the gaming machine, determined based on one or more side wagers placed, determined based on the player's primary game wager, determined based on time (such as the time of day), determined based on an amount of coin-in accumulated in one or more pools or determined based on any other suitable method or criteria.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A gaming system comprising:
(A) a plurality of gaming devices, each gaming device including:
   (a) a housing;
   (b) a plurality of input devices supported by the housing, the plurality of input devices including:
      (i) an acceptor,
      (ii) a wager button, and
      (iii) a cashout button;
   (c) at least one display device supported by the housing;
   (d) at least one processor; and
   (e) at least one memory device that stores a plurality of instructions which, when executed by the at least one processor, cause the at least one processor to operate with the at least one display device and the plurality of input devices to:
      (1) establish a credit balance for a player of said gaming device based at least in part on a first monetary value associated with a first physical item after the first physical item is received by the acceptor;
      (2) place a wager on a play of a primary game after receiving an actuation of the wager button, the credit balance of the player being decreasable by the wager;
      (3) display a play of the primary game;
      (4) determine any awards for said play of the primary game, the credit balance of the player being increasable by any determined awards; and
      (5) initiate a payout associated with the credit balance of the player after receiving an actuation of the cashout button; and
(B) at least one controller configured to operate with the plurality of gaming devices to:
   (a) for each gaming device, enable a player of said gaming device to join one of a plurality of different teams; and
   (b) for a play of a secondary team game in which the plurality of different teams compete to reach a first designated level to win a first designated award associated with the first designated level:
      (1) for each team:
         (i) monitor plays of the primary games of the gaming devices of the one or more players on said team;
         (ii) increment at least one team gaming activity parameter of said team based on the monitored one or more plays of the primary games of the gaming devices of the one or more players on said team and not based on any plays of the primary games of the gaming devices of the one or more players on the other teams; and
         (iii) determine if said incrementing caused the at least one team gaming activity parameter of said team to reach the first designated level, said determination being independent of any determination of whether the team gaming activity parameter of any other team has been incremented to the first designated level;

(2) if said incrementing caused the at least one team gaming activity parameter of one of the teams to reach but not exceed the first designated level, provide at least one player on said team with the first designated award associated with said first designated level, the credit balance of said at least one player being increasable by said first designated award, disassociate the first designated award from the first designated level, and associate a second different designated award with the first designated level, wherein the second designated award is winnable during the play of the secondary team game; and (3) if said incrementing caused the at least one team gaming activity parameter of one of the teams to exceed the first designated level, not provide any player on said team with the first designated award associated with said first designated level responsive to the at least one team gaming activity parameter of said team exceeding the first designated level such that the first designated award remains winnable during the play of the secondary team game.

2. The gaming system of claim 1, wherein the at least one controller is configured to operate with the plurality of gaming devices to enable at least one of the players of the gaming devices to switch teams at a designated time after said play of the secondary team game begins and before said play of the secondary team game ends.

3. The gaming system of claim 1, wherein the at least one controller is configured to operate with the plurality of gaming devices to enable each of the players of the gaming devices to switch teams after said play of the secondary team game begins and at a designated time before said play of the secondary team game ends.

4. The gaming system of claim 1, wherein, for each team, the at least one team gaming activity parameter includes at least one selected from the group consisting of: (i) a total amount wagered by the one or more players on said team, (ii) a total number of plays of the primary games of the gaming devices won by the one or more players on said team, (iii) a total number of plays of the primary games of the gaming devices lost by the one or more players on said team, and (iv) a total number of plays of the primary games of the gaming devices played by the one or more players on said team.

5. The gaming system of claim 1, wherein the at least one controller is configured to operate with the plurality of gaming devices to, for each team, increment said at least one team gaming activity parameter of said team based on plays of the primary games of the gaming devices of the one or more players on said team monitored during a designated time period.

6. The gaming system of claim 1, wherein the at least one controller is configured to operate with the plurality of gaming devices to enable each of the players of the gaming devices to switch teams a plurality of times during said play of the secondary team game.

7. The gaming system of claim 1, wherein each of said teams includes a plurality of players.

8. The gaming system of claim 1, wherein the at least one controller is configured to operate with the plurality of gaming devices to, for the play of the secondary team game, for each team, for each player on said team, determine a player score based on monitored plays of the primary games of the gaming device of said player.

9. The gaming system of claim 8, wherein the at least one controller is configured to operate with the plurality of gaming devices to, for the play of the secondary team game, for each team, increment the at least one team gaming activity parameter for said team based on the determined player scores of the one or more players on said team.

10. A method of operating a gaming system, said method comprising:
(a) for each of a plurality of gaming devices, causing at least one processor to execute a plurality of instructions to operate with at least one input device and at least one display device to enable a player of said gaming device to wager on one or more plays of a primary game via at least one wager button and to display said wagered-on plays of the primary game, said wager being deducted from a credit balance of the player, the credit balance being:
(i) increasable via receipt, by an acceptor, of a first physical item associated with a first monetary value; and
(ii) decreasable via actuation of a cashout button to cause an initiation of a payout associated with the credit balance;
(b) causing at least one controller to operate with the plurality of gaming devices to, for each gaming device, enable the player of said gaming device to join one of a plurality of different teams; and
(c) for a play of a secondary team game in which the plurality of different teams compete to reach a first designated level to win a first designated award associated with the first designated level:
(1) for each team:
(i) causing the at least one controller to operate with the plurality of gaming devices to monitor plays of the primary games of the gaming devices of the one or more players on said team;
(ii) causing the at least one controller to operate with the plurality of gaming devices to increment at least one team gaming activity parameter of said team based on the monitored one or more plays of the primary games of the gaming devices of the one or more players on said team and not based on any plays of the primary games of the gaming devices of the one or more players on the other teams; and
(iii) causing the at least one controller to operate with the plurality of gaming devices to determine if said incrementing caused the at least one team gaming activity parameter of said team to reach the first designated level, said determination being independent of any determination of whether the team gaming activity parameter of any other team has been incremented to the first designated level;
(2) if said incrementing caused the at least one team gaming activity parameter of one of the teams to reach but not exceed the first designated level, providing at least one player on said team with the first designated award associated with said first designated level, the credit balance of said player being increasable by said first designated award, causing the at least one controller to disassociate the first designated award from the first designated level, and causing the at least one controller to associate a second different designated award with the first designated level, wherein the second designated award is winnable during the play of the secondary team game; and (v) if said incrementing caused the at least one team gaming activity parameter of one of the teams to exceed the first designated level, not providing any player on said team with the first designated award associated with said first designated level responsive to the at least one team gaming activity parameter of said team exceeding the first designated level such that the first designated award remains winnable during the play of the secondary team game.

11. The method of claim 10, which includes causing the at least one controller to operate with the plurality of gaming devices to enable at least one of the players of the gaming devices to switch teams at a designated time after said play of the secondary team game begins and before said play of the secondary team game ends.

12. The method of claim 10, which includes causing the at least one controller to operate with the plurality of gaming devices to enable each of the players of the gaming devices to switch teams after said play of the secondary team game begins and at a designated time before said play of the secondary team game ends.

13. The method of claim 10, wherein, for each team, the at least one team gaming activity parameter includes at least one selected from the group consisting of: (i) a total amount wagered by the one or more players on said team, (ii) a total number of plays of the primary games of the gaming devices won by the one or more players on said team, (iii) a total number of plays of the primary games of the gaming devices lost by the one or more players on said team, and (iv) a total number of plays of the primary games of the gaming devices played by the one or more players on said team.

14. The method of claim 10, which includes causing the at least one controller to operate with the plurality of gaming devices to, for each team, increment said at least one team gaming activity parameter of said team based on plays of the primary games of the gaming devices of the one or more players on said team monitored during a designated time period.

15. The method of claim 10, which includes causing the at least one controller to operate with the plurality of gaming devices to enable each of the players of the gaming devices to switch teams a plurality of times during said play of the secondary team game.

16. The method of claim 10, wherein each of said teams includes a plurality of players.

17. The method of claim 10, which includes causing the at least one controller to operate with the plurality of gaming devices to, for the play of the secondary team game, for each team, for each player on said team, determine a player score based on monitored plays of the primary games of the gaming devices of said player.

18. The method of claim 17, which includes causing the at least one controller to operate with the plurality of gaming devices to, for the play of the secondary team game, for each team, increment the at least one team gaming activity parameter for said team based on the determined player scores of the one or more players on said team.

19. The method of claim 10, which is at least partially provided through a data network.

20. The method of claim 19, wherein the data network is an internet.

* * * * *